United States Patent
Yang et al.

(10) Patent No.: US 12,120,424 B2
(45) Date of Patent: Oct. 15, 2024

(54) METHOD, APPARATUS, DEVICE AND STORAGE MEDIUM FOR IMAGE SHOOTING

(71) Applicant: Douyin Vision Co., Ltd., Beijing (CN)

(72) Inventors: Mingyu Yang, Beijing (CN); Anqi Wang, Beijing (CN); Xin Xie, Beijing (CN); Yang Wang, Beijing (CN); Hao Qiu, Beijing (CN); Kehong Chen, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 0 days.

(21) Appl. No.: 18/195,809

(22) Filed: May 10, 2023

(65) Prior Publication Data
US 2024/0080550 A1  Mar. 7, 2024

(30) Foreign Application Priority Data
Sep. 6, 2022 (CN) .......................... 202211086344.X

(51) Int. Cl.
*H04N 23/667* (2023.01)
*H04N 5/262* (2006.01)
(Continued)

(52) U.S. Cl.
CPC ......... *H04N 23/667* (2023.01); *H04N 5/2624* (2013.01); *H04N 5/2628* (2013.01);
(Continued)

(58) Field of Classification Search
CPC .. H04N 23/667; H04N 23/633; H04N 23/632; H04N 23/62; H04N 5/2624; H04N 5/2628; H04N 5/265
(Continued)

(56) References Cited

U.S. PATENT DOCUMENTS 7,823,056 B1  10/2010  Davey et al.
8,665,333 B1  3/2014  Sharma et al.
(Continued)

FOREIGN PATENT DOCUMENTS

CN  101388988 A  3/2009
CN  102568260 A  7/2012
(Continued)

OTHER PUBLICATIONS

International Search Report and Written Opinion in PCT/CN2023/105002, dated Oct. 17, 2023, 8 pages.
(Continued)

*Primary Examiner* — Pritham D Prabhakher
(74) *Attorney, Agent, or Firm* — Astute IP Law Group

(57) ABSTRACT

According to embodiments of the present disclosure, a method, apparatus, device and storage medium for image shooting are provided. The method comprises presenting a first shooting page in an asynchronous shooting mode. The first shooting page includes a first shooting window for presenting a first scene captured by a first camera of a terminal device. The method further comprises in response to the first camera completing shooting of a first image, presenting a second shooting page comprising a second shooting window and a first image window. The second shooting window presents a second scene captured by a second camera different from the first camera. The first image window presents the first image. The method further comprises capturing a second image by the second camera while the second shooting page being presented. In this way, flexible and interesting image shooting experience is provided.

21 Claims, 31 Drawing Sheets

(51) Int. Cl.
  *H04N 5/265* (2006.01)
  *H04N 23/62* (2023.01)
  *H04N 23/63* (2023.01)

(52) U.S. Cl.
  CPC ............ *H04N 5/265* (2013.01); *H04N 23/62* (2023.01); *H04N 23/632* (2023.01); *H04N 23/633* (2023.01)

(58) Field of Classification Search
  USPC .................................................... 348/333.05
  See application file for complete search history.

(56) References Cited

U.S. PATENT DOCUMENTS

| | | | |
|---|---|---|---|
| 8,953,079 | B2 | 2/2015 | Raju et al. |
| 9,325,903 | B2 | 4/2016 | Kim et al. |
| 9,349,414 | B1 | 5/2016 | Furment et al. |
| 9,491,367 | B2 | 11/2016 | Lee et al. |
| 9,509,916 | B2 | 11/2016 | Li et al. |
| 9,565,333 | B2 | 4/2017 | Kim et al. |
| 9,578,233 | B2 | 11/2017 | Aoyama et al. |
| 10,007,476 | B1* | 6/2018 | Glikmann ............. H04L 67/125 |
| 10,136,069 | B2 | 11/2018 | Kim et al. |
| 10,200,599 | B1* | 2/2019 | Baldwin ............. H04N 23/745 |
| 10,423,194 | B2* | 9/2019 | Lee ......................... G02B 13/06 |
| 10,511,757 | B2* | 12/2019 | Yoshizawa ........... H04N 23/661 |
| 10,652,198 | B1 | 5/2020 | Morrison et al. |
| 10,693,956 | B1 | 6/2020 | Green et al. |
| 10,871,798 | B2* | 12/2020 | Lee ...................... H04N 23/611 |
| 10,944,908 | B2* | 3/2021 | An ........................ H04N 23/661 |
| 11,012,639 | B2* | 5/2021 | Kim ........................ H04N 5/272 |
| 11,115,591 | B2 | 9/2021 | Wei |
| 11,115,598 | B2 | 9/2021 | Yim |
| 11,258,736 | B2 | 2/2022 | Shelley |
| 11,412,276 | B2 | 8/2022 | Bloch et al. |
| 11,470,051 | B1 | 10/2022 | Berkas et al. |
| 11,765,463 | B2* | 9/2023 | Li ........................... H04N 23/45 348/207.99 |
| 2004/0179816 | A1 | 9/2004 | Takehana |
| 2005/0232586 | A1 | 10/2005 | Tsuchiya et al. |
| 2009/0141981 | A1 | 6/2009 | Chan |
| 2010/0077289 | A1 | 3/2010 | Das et al. |
| 2010/0251109 | A1 | 9/2010 | Jin et al. |
| 2010/0281375 | A1 | 11/2010 | Pendergast et al. |
| 2012/0081392 | A1 | 4/2012 | Arthur |
| 2012/0120186 | A1 | 5/2012 | Diaz et al. |
| 2012/0268552 | A1 | 10/2012 | Choi et al. |
| 2012/0274808 | A1 | 11/2012 | Chong et al. |
| 2013/0111366 | A1 | 5/2013 | Silbey et al. |
| 2013/0125000 | A1 | 5/2013 | Fleischhauer et al. |
| 2013/0227414 | A1 | 8/2013 | Hwang et al. |
| 2013/0235224 | A1 | 9/2013 | Park et al. |
| 2013/0298026 | A1 | 11/2013 | Fitzpatrick |
| 2013/0329100 | A1 | 12/2013 | Desai et al. |
| 2014/0047371 | A1 | 2/2014 | Palmer et al. |
| 2014/0192212 | A1 | 7/2014 | He et al. |
| 2014/0229544 | A1 | 8/2014 | Evans et al. |
| 2014/0232904 | A1 | 8/2014 | Na et al. |
| 2014/0232906 | A1 | 8/2014 | Ha et al. |
| 2014/0232921 | A1* | 8/2014 | Kim ..................... H04N 23/631 348/333.05 |
| 2014/0240551 | A1 | 8/2014 | Kim et al. |
| 2014/0267842 | A1 | 9/2014 | Lee et al. |
| 2014/0324605 | A1 | 10/2014 | Steelberg et al. |
| 2015/0062434 | A1 | 3/2015 | Deng et al. |
| 2015/0163562 | A1 | 6/2015 | Leventhal et al. |
| 2015/0237268 | A1* | 8/2015 | Vaiaoga ................. H04N 23/90 348/218.1 |
| 2015/0277638 | A1 | 10/2015 | Bustamante |
| 2015/0288742 | A1 | 10/2015 | Flynn et al. |
| 2015/0363811 | A1 | 12/2015 | Candillier |
| 2016/0224767 | A1 | 8/2016 | Steelberg |
| 2016/0248864 | A1 | 8/2016 | Loia et al. |
| 2016/0249108 | A1 | 8/2016 | Sexton |
| 2016/0284383 | A1 | 9/2016 | Kozakura |
| 2016/0366294 | A1* | 12/2016 | Uroskin ............. H04N 1/00493 |
| 2017/0064208 | A1* | 3/2017 | Salimpour ............ G06F 3/0484 |
| 2017/0085803 | A1 | 3/2017 | Chin et al. |
| 2017/0094019 | A1 | 3/2017 | Ahmed et al. |
| 2017/0195615 | A1 | 7/2017 | Han et al. |
| 2017/0201714 | A1 | 7/2017 | Kim et al. |
| 2017/0256288 | A1 | 9/2017 | Ai et al. |
| 2017/0289462 | A1* | 10/2017 | Eum ...................... H04N 23/45 |
| 2017/0337652 | A1 | 11/2017 | Sarin |
| 2018/0033153 | A1 | 2/2018 | Hirasawa et al. |
| 2018/0121082 | A1* | 5/2018 | Zhu ..................... G06F 3/04847 |
| 2018/0196472 | A1* | 7/2018 | Lee ....................... G06F 3/0488 |
| 2018/0234589 | A1 | 8/2018 | Xiao |
| 2018/0376078 | A1 | 12/2018 | Adachi et al. |
| 2019/0005253 | A1 | 1/2019 | Floury et al. |
| 2019/0014372 | A1 | 1/2019 | Kandagal et al. |
| 2019/0075066 | A1 | 3/2019 | Cho et al. |
| 2019/0087938 | A1 | 3/2019 | Iddings |
| 2019/0174056 | A1 | 6/2019 | Jung et al. |
| 2019/0199926 | A1* | 6/2019 | An ........................ H04N 23/632 |
| 2019/0288972 | A1 | 9/2019 | Morrison |
| 2019/0342616 | A1 | 11/2019 | Domm et al. |
| 2020/0099838 | A1 | 3/2020 | Song et al. |
| 2020/0106952 | A1 | 4/2020 | Missig et al. |
| 2020/0223454 | A1 | 7/2020 | Fox et al. |
| 2020/0302414 | A1 | 9/2020 | Pachera |
| 2021/0014415 | A1 | 1/2021 | Wei |
| 2021/0026511 | A1* | 1/2021 | Ye .................... H04N 21/43615 |
| 2021/0027576 | A1 | 1/2021 | Nelson et al. |
| 2021/0051295 | A1 | 2/2021 | Khawam |
| 2021/0067741 | A1 | 3/2021 | Yoshizawa et al. |
| 2021/0099407 | A1 | 4/2021 | Al Majid et al. |
| 2021/0152753 | A1 | 5/2021 | Zhu |
| 2021/0297604 | A1* | 9/2021 | Matiossian .......... H04N 5/2624 |
| 2022/0159183 | A1 | 5/2022 | Li et al. |
| 2022/0239832 | A1 | 7/2022 | Tyagi et al. |
| 2022/0294992 | A1* | 9/2022 | Manzari ............. H04N 23/633 |
| 2022/0377254 | A1 | 11/2022 | Wang et al. |
| 2023/0007085 | A1 | 1/2023 | Berliner et al. |
| 2023/0076870 | A1 | 3/2023 | Arnold et al. |
| 2023/0088720 | A1 | 3/2023 | Wang et al. |

FOREIGN PATENT DOCUMENTS

| | | |
|---|---|---|
| CN | 102938825 A | 2/2013 |
| CN | 103745736 A | 4/2014 |
| CN | 104104870 A | 10/2014 |
| CN | 104980659 A | 10/2015 |
| CN | 105009566 A | 10/2015 |
| CN | 105103535 A | 11/2015 |
| CN | 105376396 A | 3/2016 |
| CN | 106060526 A | 10/2016 |
| CN | 106165430 A | 11/2016 |
| CN | 106210629 A | 12/2016 |
| CN | 106231095 A | 12/2016 |
| CN | 106559686 A | 4/2017 |
| CN | 106662965 A | 5/2017 |
| CN | 106851162 A | 6/2017 |
| CN | 106973234 A | 7/2017 |
| CN | 107105315 A | 8/2017 |
| CN | 107509029 A | 12/2017 |
| CN | 107566725 A | 1/2018 |
| CN | 107846547 A | 3/2018 |
| CN | 108234891 A | 6/2018 |
| CN | 108419016 A | 8/2018 |
| CN | 109089059 A | 12/2018 |
| CN | 109151537 A | 1/2019 |
| CN | 109167937 A | 1/2019 |
| CN | 109729266 A | 5/2019 |
| CN | 110166652 A | 8/2019 |
| CN | 110740261 A | 1/2020 |
| CN | 110784674 A | 2/2020 |
| CN | 110809100 A | 2/2020 |
| CN | 111143662 A | 5/2020 |
| CN | 112004032 A | 11/2020 |
| CN | 112445389 A | 3/2021 |
| CN | 306373989 S | 3/2021 |
| CN | 113422903 A | 9/2021 |

(56) References Cited

FOREIGN PATENT DOCUMENTS

| CN | 113497894 A | 10/2021 |
|---|---|---|
| CN | 110784674 B | 3/2022 |
| CN | 110830714 B | 3/2022 |
| CN | 114979495 A | 8/2022 |
| CN | 115334246 A | 11/2022 |
| EP | 1841225 A3 | 3/2008 |
| WO | 2021136268 A1 | 7/2021 |

OTHER PUBLICATIONS

Office Action in CN202211086344.X, dated May 25, 2023, 11 pages.
"Android realizes View style (example demo) that follows fingers dragging and automatically borders)_Android_Script House," mmr, Script House, Jan. 13, 2017, 10 pages.
International Search Report in PCT/CN2020/124036, mailed Feb. 2, 2021, 3 pages.
International Search Report in PCT/CN2020/124038, mailed Jan. 11, 2021, 4 pages.
International Search Report in PCT/CN2023/105064, mailed Oct. 16, 2023, 7 pages.
International Search Report in PCT/CN2023/116256, mailed Nov. 20, 2023, 8 pages.
Office Action in CN201911047107.0, mailed Oct. 20, 2020, 10 pages.
Office Action in CN201911047107.0, mailed Apr. 20, 2021, 12 pages.
Office Action in CN201911047128.2, mailed Feb. 2, 2021, 15 pages.
Office Action in CN201911047141.8, mailed Feb. 2, 2021, 13 pages.
Office Action in CN202211086344.X, mailed Nov. 29, 2023, 15 pages.
Office Action in IN202227025132, mailed Nov. 17, 2022, 7 pages.

* cited by examiner

US 12,120,424 B2

METHOD, APPARATUS, DEVICE AND STORAGE MEDIUM FOR IMAGE SHOOTING

CROSS-REFERENCE TO RELATED APPLICATION(S)

This application claims priority to and benefits of Chinese Patent Application No. 202211086344.X, filed on Sep. 6, 2022, and entitled "METHOD, APPARATUS, DEVICE AND STORAGE MEDIUM FOR IMAGE SHOOTING", the entire disclosure of which is hereby incorporated by reference.

TECHNICAL FIELD

Example embodiments of the present disclosure generally relate to the field of computer technology, and specifically, to a method, apparatus, device and computer-readable storage medium for image shooting.

BACKGROUND

More applications are currently designed to provide various services to users. Users may use content sharing applications to view, comment and repost various content such as videos, pictures, picture collections, sound, and so on. Content sharing applications further allow users to create and post various multimedia contents. Application providers expect to encourage more users to participate in content creating and posting. This can provide more and richer multimedia content on the platform while increasing the user stickiness to the applications.

SUMMARY

In a first aspect of the present disclosure, a method of image shooting is provided. The method comprises presenting a first shooting page in an asynchronous shooting mode. The first shooting page includes a first shooting window for presenting a first scene captured by a first camera of a terminal device. The method further comprises in response to the first camera completing shooting of a first image, presenting a second shooting page comprising a second shooting window and a first image window. The second shooting window presents a second scene captured by a second camera different from the first camera. The first image window presents the first image. The method further comprises capturing a second image by the second camera while the second shooting page being presented.

In a second aspect of the present disclosure, an apparatus for image shooting is provided. The apparatus comprises: a first shooting page presentation module configured to present a first shooting page in an asynchronous shooting mode. The first shooting page includes a first shooting window for presenting a first scene captured by a first camera of a terminal device. The apparatus further comprises a second shooting page presentation module configured to in response to the first camera completing shooting of a first image, present a second shooting page comprising a second shooting window and a first image window. The second shooting window presents a second scene captured by a second camera different from the first camera. The first image window presents the first image. The apparatus further comprises a second camera capturing module configured to capture a second image by the second camera while the second shooting page being presented.

In a third aspect of the present disclosure, an electronic device is provided. The device comprises: at least one processing unit; a first and a second cameras; and at least one memory, coupled to the at least one processing unit and storing instructions to be executed by the at least one processing unit. The instructions, when executed by the at least one processing unit, cause the device to perform a method according to the first aspect.

In a fourth aspect of the present disclosure, a computer-readable storage medium is provided. A computer program is stored on the medium, which, when executed by a processor, implements a method according to the first aspect.

It is to be understood that the Summary is neither intended to identify key features or essential features of the present disclosure, nor is it intended to be used to limit the scope of the present disclosure. Other features of the present disclosure will become easy to understand from the description below.

BRIEF DESCRIPTION OF THE DRAWINGS

Through the more detailed description with reference to the accompanying drawings, the above and other features, advantages and aspects of the present disclosure will become more apparent. Throughout the drawings, the same or similar reference numerals represent the same or similar elements, among which.

DETAILED DESCRIPTION OF EMBODIMENTS

Figure 1:
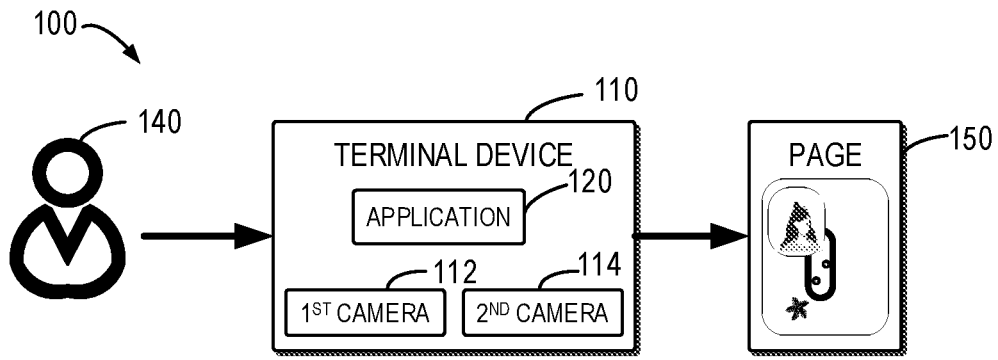
FIG. 1 illustrates a schematic view of an example environment in which embodiments of the present disclosure can be implemented.

Embodiments of the present disclosure will be described in more detail with reference to the accompanying drawings, in which some embodiments of the present disclosure have been illustrated. However, it is to be understood that the present disclosure can be implemented in various manners, and thus should not be construed to be limited to embodiments disclosed herein. On the contrary, those embodiments are provided for the thorough and complete understanding of the present disclosure. It is to be understood that the drawings and embodiments of the present disclosure are merely for the purpose of illustration, rather than limiting the protection scope of the present disclosure.

In the description of embodiments of the present disclosure, the term "includes" and its variants are to be read as open terms that mean "includes, but is not limited to." The term "based on" is to be read as "based at least in part on." The terms "one embodiment" or "a embodiment" are to be read as "at least one embodiment." The term "some embodiments" is to be read as "at least some embodiments." Other definitions, either explicit or implicit, may be included below.

As used herein, the term "image" may refer to multimedia content such as a static image or picture (e.g., photo), a dynamic image or picture (e.g., video) and the like. As used hereinafter, unless stated explicitly, the term "picture" refers to static picture. In some embodiments, the image may comprise audio information or the like. The image may be captured by a single camera or composited from multiple images captured by multiple cameras.

It is to be understood that data involved in the present technical solution (including but not limited to the data itself, the acquisition or use of the data) should comply with requirements of corresponding laws and regulations and relevant rules.

It is to be understood that, before applying the technical solutions disclosed in various embodiments of the present disclosure, the user should be informed of the type, scope of use, and use scenario of the personal information involved in the subject matter described herein in an appropriate manner in accordance with relevant laws and regulations, and user authorization should be obtained.

For example, in response to receiving an active request from the user, prompt information is sent to the user to explicitly inform the user that the requested operation would acquire and use the user's personal information. Therefore, according to the prompt information, the user may decide on his/her own whether to provide the personal information to the software or hardware, such as electronic devices, applications, servers, or storage media that perform operations of the technical solutions of the subject matter described herein.

As an optional but non-limiting implementation, in response to receiving an active request from the user, the way of sending the prompt information to the user may, for example, include a pop-up window, and the prompt information may be presented in the form of text in the pop-up window. In addition, the pop-up window may also carry a select control for the user to choose to "agree" or "disagree" to provide the personal information to the electronic device.

It is to be understood that the above process of notifying and obtaining the user authorization is only illustrative and does not limit the implementations of the present disclosure. Other methods that satisfy relevant laws and regulations are also applicable to the implementations of the present disclosure.

FIG. 1 illustrates a schematic view of an example environment 100 in which embodiments of the present disclosure can be implemented. In the example environment 100, an application 120 is installed in a terminal device 110. A user 140 may interact with the application 120 via the terminal device 110 and/or a device attached to the terminal device 110. The application 120 may be a content sharing application that can provide the user 140 with various services related to multimedia content, such as browsing, commenting, reposting, creating (e.g., shooting and/or editing) and posting multimedia content. As used herein, "multimedia content" may be content in various forms, including videos, audios, pictures, picture collections, text, etc.

In the environment 100 of FIG. 1, if the application 120 is in an active state, the terminal device 110 may present a page 150 of the application 120. The page 150 may be presented in a graphical user interface (GUI) displayed by the display device. For the sake of illustration, unless otherwise specified, pages, windows or other graphical representations described hereinafter may be displayed in the GUI displayed by the display device. The page 150 may include various pages which the application 120 can provide, such as a multimedia content presenting page, a content creating page, a content post page, a message page, a personal page, etc. The application 120 may provide a content creating function to shoot and/or creating multimedia content, so that the user 140 can edit the captured or uploaded multimedia content, etc. The application 120 may further have a post function to allow the user 140 to post the created multimedia content. It is to be understood that the presented content shown in the page 150 of FIG. 1 is only illustrative, not limiting. Various different contents may be presented in the page 150.

In some embodiments, the terminal device 110 may be provided with a plurality of cameras or communicatively connected with a plurality of external cameras. For example, the terminal device 110 may be provided with a first camera 112 and a second camera 114 to capture images. It is to be understood that although the first camera 112 and the second camera 114 in FIG. 1 are both located in the terminal device 110, in some embodiments, one or more of the first camera 112 and the second camera 114 may an external camera communicatively connected with the terminal device 110. It is to be understood that although there are only two cameras shown in FIG. 1, in some embodiments, more cameras may be provided. In some embodiments, the page 150 may be a shooting page for the first camera 112 and/or the second camera 114. Alternatively, or in addition, in some embodiments, the first camera 112 and/or second camera 114.

In some embodiments, the terminal device 110 communicates with a remote device such as a server (not shown) to provide services for the application 120. The terminal device 110 may be any type of mobile, fixed or portable terminal, including a mobile phone, a desktop computer, a laptop computer, a notebook computer, a netbook computer, a tablet computer, a media computer, a multimedia tablet, a Personal Communication System (PCS) device, a personal navigation device, a Personal Digital Assistant (PDA), an audio/video player, a digital camera/video, a positioning device, a television receiver, a radio broadcast receiver, an electronic book device, a gaming device or any other combination thereof consisting of accessories and peripherals of these devices or any other combination thereof. In some embodiments, the terminal device 110 can also support any type of interface (such as a "wearable" circuit, and the like) for the user 140. The remote device is various types of computing system/server that can provide computing capability, including, without limitation to, a mainframe, an edge computing node, a computing device in a cloud environment, etc.

It is to be understood that the structures and functionalities of various elements in the environment 100 have been described only for the purpose of illustration, rather than limiting the scope of the present disclosure. In the environment 100, there may exist any number of terminal devices.

As mentioned earlier, more and more applications, such as content sharing applications, are designed to provide users with various services. Generally, some content sharing applications will provide a function of capturing multimedia content. For example, multimedia content may include such as video, pictures, picture sets, sounds, and the like.

Some conventional content sharing applications can provide a function of shooting image content of a single scene. For example, these applications usually only support shooting image by a front camera or shooting image by a rear camera. However, users sometimes may want to shoot image content of more than one scene to share richer content.

Embodiments of the present disclosure supports an asynchronous shooting mode, in which different cameras of a device may successively capture images. As will be described below, according to embodiments of the present disclosure, a user is allowed to operate one camera of the device to capture and shoot first. After the camera completes shooting, the user is prompted to continue to shoot with a different camera. At this time, the user can not only see the scene captured by the second camera through a device screen, but also see the image captured by the previous camera. In this way, the user can see and refer to the previous images captured with the different camera while shooting of a subsequent image, so that the images captured asynchronously with different cameras can be more matched with each other. In this way, for example, if the user expects to synthesize the asynchronously captured images, a better composite image can be obtained. In addition, this flexible image shooting scheme can also improve user participation and experience.

On the other hand, this solution provides two different shooting pages that are easy to operate. According to the page layout of different shooting pages presented, the user can know which camera will be shooting currently. The shooting process is simple and reduces the user's operation complexity. In this way, creating content can become more convenient and quickly for users, and also meet different shooting needs.

Some exemplary embodiments of the present disclosure will be described below with reference to the accompanying drawings.

Figure 2:
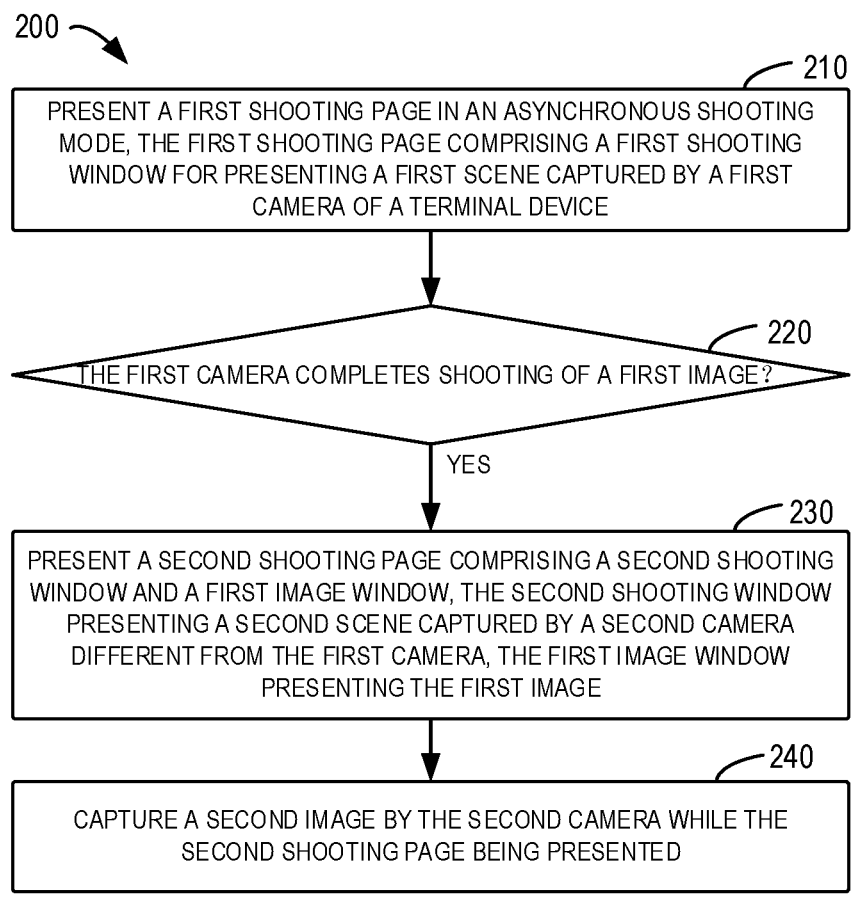
FIG. 2 illustrates a flowchart of a process for image shooting according to some embodiments of the present disclosure.

FIG. 2 illustrates a flowchart of a process 200 for image shooting according to some embodiments of the present disclosure. The process 200 can be implemented at the terminal device 110. For the sake of discussion, the process 200 will be described with reference to the environment 100 of FIG. 1. It is to be understood that the process 200 may include an additional act which is not shown and/or omit an act which is shown, and the scope of the present disclosure is not limited in this regard.

At block 210, the terminal device 110 presents a first shooting page in an asynchronous shooting mode. The first shooting page includes a first shooting window for displaying a first scene captured by the first camera 112 of the terminal device 110. For example, in some embodiments, the first camera 112 may be a rear camera or a front camera on the terminal device 110. As another example, the first camera 112 may also be an external camera communicatively coupled with the terminal device 110. As used herein, for the convenience of discussion, the first camera 112 is illustrated as the front or rear camera of the terminal device 110 for example.

As used herein, "asynchronous shooting mode" refers to a mode in which images are shot by different cameras of the terminal device 110 or by different cameras communicating with the terminal device 110 at different time points. For example, in the asynchronous shooting mode, the first camera 112 may first perform image shooting, and then the second camera 114 may perform image shooting. As used herein, "first shooting page" refers to a shooting page associated with image shooting by the first camera 112 in the asynchronous shooting mode. The first image may be captured by the first camera 112 while the first shooting page is presented. The first image may be an image or a video or the like.

Figure 3A:
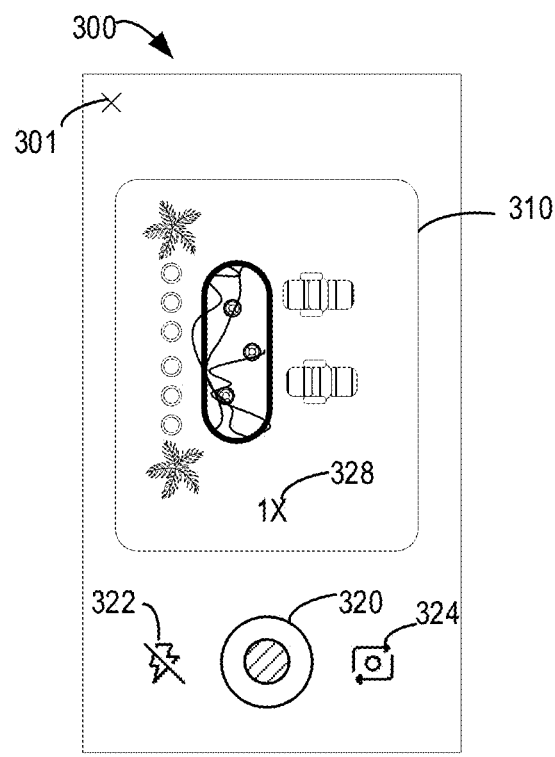
FIGS. 3A to 3C illustrate schematic views of example shooting pages of an application according to some embodiments of the present disclosure.

FIG. 3A shows an example first shooting page 300 according to some embodiments of the present disclosure. The first shooting page 300 may be a page provided by the application 120. The first shooting page 300 includes a first shooting window 310 for presenting the first scene captured by the first camera 112. The first shooting window 310 may have a predetermined size, which may be set or adjusted according to a size of a display window of the terminal device 110, for example. As an example, in some embodiments, the first shooting window 310 may have a 3:4, 9:16, 1:1 or other appropriate proportion of frames.

In the illustrated example where the first camera 112 is a rear camera, the first shooting window 310 is also referred to as a rear-view window. In an example where the first camera 112 (not shown) is a front camera, the first shooting window 310 is also referred to as a front view window. In some embodiments, a first real-time motion picture associated with the first camera 112 may be presented in the first shooting window 310. For example, the first real-time motion picture may include a real-time picture of the environment in which the user 140 is located.

In some embodiments, a shooting control for controlling camera to shooting of image is provided. For example, the shooting control may be the shooting control 320 in the first shooting page 300. Additionally, or alternatively, in some embodiments, the shooting control may not be set in the first shooting page 300 (not shown). For example, the shooting control may be a specific key on the terminal device 110, such as a volume key (not shown), and the like. The user 140 may instruct the terminal device 110 to enable the first camera 112 and/or the second camera 114 to capture or take an image by performing a predetermined operation on the volume key. It is to be understood that examples of the shooting controls listed above are only illustrative. Any suitable shooting control can be set, and the scope of the present disclosure is not limited in this respect. Hereinafter, the shooting control presented on the shooting page will be described as an example.

In some embodiments, the shooting control 320 is configured to capture an image, such as a static image or a dynamic image. The type of image to be captured may be selected by the user 140.

In some embodiments, the capture control 320 is configured to capture static images (e. g., pictures) by default. In this example, the user 140 may command to switch the type of captured image from a static image to a dynamic image (e. g., video). If the image type switch command is received from the user 140, the shooting control 320 will be configured to capture a dynamic image. Alternatively, in some embodiments, the shooting control 320 is configured to be used for shooting of a dynamic image by default. The user 140 may indicate that the type of the captured image is switched from a dynamic image to a static image. If this image type switch command is received from the user 140, the shooting control 320 will be configured to capture a static image.

In some embodiments, the user 140 may indicate the image type switch by performing a predetermined operation. Examples of predetermined operations include, but are not limited to, touching the shooting control 320 or pressing the shooting control 320 for more than a certain period of time, and the like. The predetermined operation may also include clicking or selecting an image type switch control (not shown). The image type switch control may be displayed in the first shooting page 300. The image type switch control may also be hidden. The user may expand the hidden image type switch control by triggering (for example, clicking) a certain position in the shooting page 300 (for example, a lower right corner or other appropriate positions).

It is to be understood that, in addition to or as an alternative to the predetermined operations listed above for switching image types, switching of image types may also be indicated in other ways. Examples of other methods include, but are not limited to, voice control commands, triggering of hardware keys, specific gestures on specific pages (for example, sliding gestures), and so on. The scope of this disclosure is not limited in this respect.

In some embodiments, the first shooting window 310 is provided with a zoom multiple control 328 for zooming the first scene. A zoom multiple may be preset to 1× (one focal length). If a predetermined operation (for example, clicking) is performed on the zoom multiple control 328, the zoom multiple will become 2× (double focus). If a further predetermined operation is performed on the zoom multiple control 328 (for example, clicking again), the zoom multiple will become 0.5× (0.5× focal length).

It is to be understood that the change scheme of the zoom multiple described above is only exemplary. Any suitable rule may be adopted to change the zoom multiple by operating the zoom multiple control 328. Additionally, or alternatively, in some embodiments, the zoom multiple may also be changed by appropriate operations such as finger dragging the first shooting window 310, voice control, gesture control, and the like. There is no limit to how the zoom multiple can be changed here.

In some embodiments, the terminal device 110 may also provide other controls for controlling image capture. For example, the first shooting page 300 may be provided with a flash control control 322 for turning on or off the flash. The flash may be turned on by default. The flash may be turned on by performing a predetermined operation on the flash control control 322.

In some embodiments, the first shooting page 300 may also be provided with a camera flip control 324 for switching the current first camera 112 to another camera. For example, if the current first camera 112 is a rear camera, the first camera 112 is switched to a front camera in response to the user 140's selection of the camera flip control 324. If the current first camera 112 is a front camera, the first camera 112 is switched to a rear camera in response to the user 140's selection of the camera flip control 324. It is to be understood that although the image capture controls set in the first shooting page have been described as an example above, these controls may not be set in the first shooting page.

In some examples, an exit option for the first shooting page 300 may be provided. For example, the exit option may be the exit option 301 shown on the first shooting page 300. In other embodiments, the exit option may not be located in the first shooting page 300 (not shown). In the following, the exit option displayed in the shooting page will be described as an example. If it is detected that the user 140 clicks or selects the exit option 301, it can exit from the first shooting page 300. For example, a previous page of the application 120 may be switched back.

Additionally, or alternatively, in some embodiments, the first shooting page 300 may also be provided with more controls or functions. These controls or functions can be hidden, and the hidden controls or functions can be expanded by a predetermined operation (e. g., clicking on a position in the first shooting page 300). It is to be understood that the controls or functions shown here are only examples. Different numbers of controls and/or functions can be provided in the first shooting page 300. The scope of this disclosure is not limited in this regard.

In some embodiments, the first camera 112 is a rear camera by default. In such an example, the first shooting page 300 is the page presented in FIG. 3A. In this example, the first shooting page 300 may be presented in a default state. Alternatively, in some embodiments, the first shooting page 300 may also be presented according to a previous presentation state. For example, if the first shooting window currently displayed in the first shooting page 300 is the shooting window of the front camera, the first shooting page 300 will also present the first shooting window as the shooting window of the front camera at a next time. It is to be understood that in some embodiments, the first camera 112 may also be a front camera by default. The type of default camera may also be selected or changed by the user.

In some embodiments, if a predetermined operation of the shooting control 320 is detected while the first shooting page 300 is presented, the first image may be captured or taken by the first camera 112. Examples of predetermined operations of the shooting control 320 include, but are not limited to, clicking, touching, or pressing for a period of time on the shooting control 320, operating in other ways such as voice, and so on.

In some embodiments, the first camera 112 may be triggered to capture image in other ways in addition to or as an alternative to the predetermined operation of the shooting control. Examples of other triggering methods include, but are not limited to, voice control instructions, predetermined operations of hardware keys, specific gestures on specific pages (for example, sliding gestures), and so on. The scope of this disclosure is not limited in this respect.

Still refers to FIG. 2, at block 220, the terminal device 110 determines whether the first camera 112 has completed shooting of the first image. In some embodiments, if the terminal device 110 determines at block 220 that the first camera 112 has not completed the shooting of the first image, the terminal device 110 may continue to present the first shooting page 300, and periodically or otherwise continue to determine whether the first camera 112 has completed the shooting of the first image. If other commands are detected in the state while the first shooting page 300 is presented, corresponding operations may be performed according to the other commands.

If the terminal device 110 determines at block 220 that the first camera 112 has completed shooting of the first image, the terminal device 110 presents a second shooting page at block 230. The second shooting page includes a second shooting window and a first image window. The second shooting window is used to present a second scene captured by a second camera 114 different from the first camera 112. The first image window is used to present the first image captured by the first camera 112.

The second camera 114 is different from the first camera 112. For example, in an example where the first camera 112 is a rear camera, the second camera 114 may be a front camera. In an example where the first camera 112 is a front camera, the second camera 114 may be a rear camera.

As used herein, "second shooting page" refers to a shooting page associated with image shooting by the second camera 114 in an asynchronous shooting mode. The second image may be captured by the second camera 114 while the second shooting page is presented. The second image may be an image or a video.

Figure 3B:
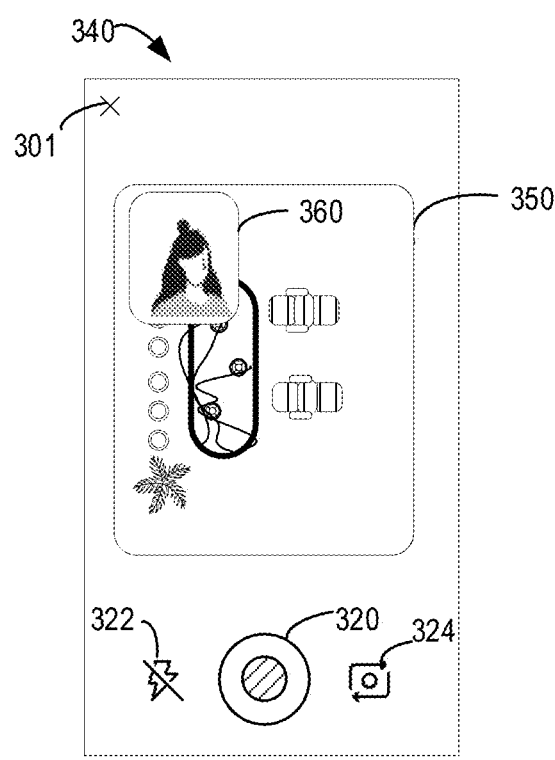

FIG. 3B shows an example second shooting page 340 according to some embodiments of the present disclosure. The second shooting page 340 may be a page provided by the application 120. The second shooting page 340 includes a second shooting window 360 for presenting the second scene captured by the second camera 114. In the illustrated example where the second camera 114 is a front camera, the second shooting window 360 is also referred to as a front-view window. In an example where the second camera 114 (not shown) is a rear camera, the second shooting window 360 is also referred to as a rear-view window. In some embodiments, the second real-time dynamic picture associated with the second camera 114 may be presented in the second shooting window 360. For example, the second real-time dynamic picture may include a real-time picture of the user 140's face.

The second shooting window 360 may have a predetermined size. Similar to the first shooting window 310, the size of the second shooting window 360 may also be set or adjusted according to the size of the display window of the terminal device 110. In some embodiments, the second shooting window 360 may have a 3:4, 9:16, 1:1 or other appropriate proportion of frames. The frame scale of the second shooting window 360 may be the same as or different from that of the first shooting window 310.

The second shooting page 340 further comprises a first image window 350. The first image window 350 presents a first image captured by the first camera 112. In the example where the first image is a static image, the first image window 350 presents the content of the static, fixed first image. In the example where the first image is a dynamic image, a thumbnail image or initial screen image of the dynamic image may be displayed in the first image window 350, or contents of the dynamic image may be played in a loop. The first image window 350 may have a predetermined size. The size of the first image window 350 may also be set or adjusted according to the size of the display window of the terminal device 110.

In some embodiments, as shown in FIG. 3A, the second shooting window 360 at least partially overlaps on the first image window 350. In other words, the size of the second shooting window 360 is smaller than the size of the first image window 350, and the second shooting window 360 at least partially overlaps on the first image window 350.

Alternatively, in other embodiments (not shown), the first image window 350 may also at least partially overlaps on the second shooting window 360. Additionally, or alternatively, in some embodiments, the second shooting window 360 may also completely overlap the first image window 350. The second shooting window 360 and/or the first image window 350 may have different transparencies. For example, the second shooting window 360 may semi-transparently overlaps on the first image window 350. It is to be understood that the mutual overlapping presentation mode of the first shooting window 360 and the first image window 350 may be arbitrary, and the scope of the present disclosure is not limited in this respect.

Similar to the first shooting page 300, the shooting control for the second shooting page 340, such as the shooting control 320, may also be set. The shooting control 320 is configured to capture an image, such as a static image or a dynamic image. The type of the second image captured by the second camera 114 may be set or switched. The second shooting page 340 may also be provided with other functions, such as flash control control 322, camera flip control 324, and the like. These controls and functions on the second shooting page 340 are similar to those on the first shooting page 300, and will not be repeated here. It is to be understood that the controls or functions shown here are only examples. Different numbers of controls and/or functions can be provided in the second shooting page 340. The scope of this disclosure is not limited in this regard.

Referring further to FIG. 2, at block 240, a second image is captured by the second camera 114 while the second shooting page 340 being presented. The second image may be a static image or a dynamic image. For example, in some embodiments, if a predetermined operation of the shooting control 320 is detected when the second shooting page 340 is presented, the second camera 114 captures the second image. Examples of predetermined operations of the shooting control 320 include, but are not limited to, clicking, touching, or pressing for a period of time on the shooting control 320, operating in other ways such as voice, and so on.

In some embodiments, the second camera 114 may be triggered to capture images in other ways in addition to the predetermined operation of the shooting control or as an alternative. Examples of other triggering methods include, but are not limited to, voice control instructions, predetermined operations of hardware keys, specific gestures on specific pages (for example, sliding gestures), and so on. The scope of this disclosure is not limited in this respect.

Additionally, or alternatively, in some embodiments, the second shooting page 340 may not include the above-described shooting control 320, flash control control 322, camera flip control 324, and the like. For example, after the first camera 112 completes capturing the first image, the second image may be automatically captured by the second camera 114 at a certain time interval. In the example where the second camera 114 automatically captures the second image, the capture control 320, the flash control control 322, the camera flip control 324, and the like may not be presented in the second shooting page 340.

Similar to the first shooting page 300, an exit option for the second shooting page 340, such as exit option 301, may also be provided. If it is detected that the user 140 clicks or selects the exit option 301, it may exit from the second shooting page 340. For example, a previous page of the application 120 may be switched back. As another example, the first shooting page 300 may be switched back.

It is to be understood that the first shooting page 300 of FIG. 3A, the second shooting page 340 of FIG. 3B, and the pages in other drawings described below are only example pages, and various page designs may exist in practice. Various graphical elements in the page may have different arrangements and different visual representations, where one or more of them may be omitted or replaced, and one or more other elements may further exist. The scope of this disclosure is not limited in this respect. In the example page below, there may be graphic elements similar to those in FIGS. 3A to 3B. These similar graphic elements will not be described repeatedly.

Several steps for presenting different shooting pages in asynchronous image shooting are described above with respect to FIG. 2. It is to be understood that although the steps are shown in a particular order in the diagram, some or all of these steps may be executed in other order or in parallel. For example, in FIG. 2, block 210 may be executed in parallel with block 220.

By providing the above different shooting pages, the user 140 can be guided to complete the shooting of two cameras respectively. For example, if a rear shooting window corresponding to the rear camera is displayed in the shooting page, the user 140 can know that an image is to be photographed with the rear camera. If a front camera shooting window corresponding to the front camera is displayed in the shooting page, the user 140 will know that the front camera is to be used for image shooting next. If the shooting window of one camera and the previously captured image of another camera are displayed in the shooting page, the user 140 will know that a subsequent image shooting is to be performed next. At this time, the user can not only see the scene captured by the current camera through the device screen, but also see the image captured by the previous camera. In this way, when using the current camera to capture subsequent images, users can see and refer to images previously captured by different cameras, so that images captured asynchronously by different cameras can be more matched with each other. In this way, for example, when the user expects to synthesize the asynchronously captured image, a better composite image can be obtained. In addition, this flexible image shooting scheme can also improve user participation and experience.

An example process of the asynchronous shooting mode and the first and second shooting pages have been described above. In some embodiments, the terminal device 110 may also support a synchronous shooting mode. "Synchronous shooting mode" is compared with "Asynchronous shooting mode". In the "synchronous shooting mode", image shooting may be performed simultaneously by a plurality of cameras, such as the first camera 112 and the second camera 114. In the shooting page in the "synchronous shooting mode", the respective shooting windows of multiple cameras may be displayed at the same time. As used herein, the shooting page in the synchronous shooting mode is also referred to as a "third shooting page".

In some embodiments, the terminal device 110 may activate different shooting modes according to capabilities of the terminal device 110. For example, if the terminal device 110 receives a shooting mode activation command or a shooting start command, the terminal device 110 determines whether the terminal device 110 supports synchronous shooting of multiple cameras (also known as simultaneous shooting). In some embodiments, the application 120 installed on the terminal device 110 may provide a shooting function. The shooting mode activation command may include a predetermined operation of the shooting function provided by the application 120, such as selection or clicking of the shooting function. Examples of the shooting mode activation command include, but are not limited to, a voice control instruction, a predetermined operation of a hardware key, a specific gesture in a specific page (e. g., a sliding gesture), and the like. The scope of this disclosure is not limited in this respect.

In some embodiments, if the terminal device 110 does not support synchronous shooting by multiple cameras (such as the first camera 112 and the second camera 114), the terminal device 110 activates the asynchronous shooting mode. In addition, the terminal device 110 may also activate the first camera 112. In the activated asynchronous shooting mode, the terminal device 110 may perform various steps as described in FIG. 2 and optionally other additional steps.

If the terminal device 110 supports simultaneous shooting by multiple cameras, such as the first camera 112 and the second camera 114, the terminal device 110 activates the synchronous shooting mode. If the synchronous shooting mode is activated, the terminal device 110 activates the first camera 112 and the second camera 114 for synchronous shooting of images. Additionally, the terminal device 110 may also present a third shooting page. The third shooting page includes a third and a fourth shooting windows. The third shooting window is used to present the first scene captured by the first camera 112, and the fourth shooting window is used to present the second scene captured by the second camera 114.

Figure 3C:
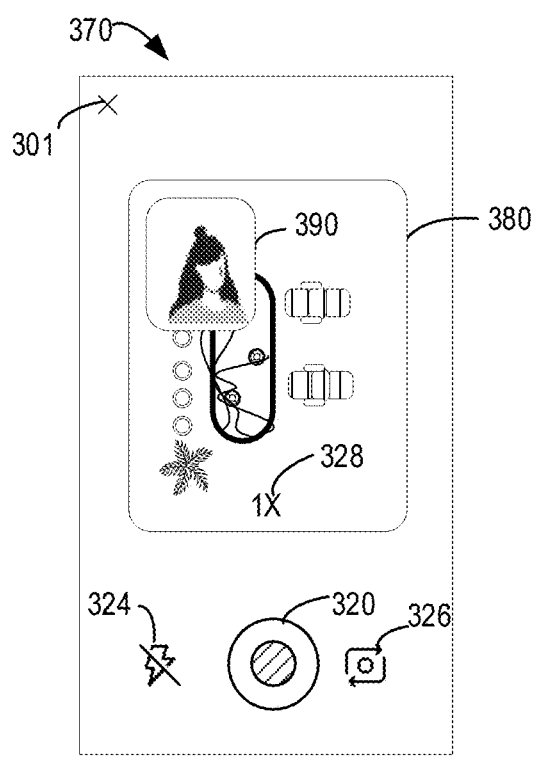

FIG. 3C shows an example third shooting page 370 according to some embodiments of the present disclosure. The third shooting page 370 may be a page provided by the application 120. The third shooting page 370 includes a third shooting window 380 and a fourth shooting window 390.

In some embodiments, as shown in FIG. 3C, the fourth shooting window 390 at least partially overlaps on the third shooting window 380. Alternatively, in other embodiments (not shown), the third shooting window 380 may also at least partially overlaps on the fourth shooting window 390. Additionally, or alternatively, in some embodiments, the third shooting window 380 and the fourth shooting window 390 may have different transparencies. For example, the fourth shooting window 390 may semi-transparently overlaps on the third image window 380. It is to be understood that the presentation mode of mutual superposition of the third shooting window 380 and the fourth shooting window 390 may be arbitrary, and the scope of the present disclosure is not limited in this respect.

In some embodiments, a third real-time dynamic picture associated with the first camera 112 is presented in the third shooting window 380. For example, the third real-time dynamic picture may include a real-time picture of the environment in which the user 140 is located. Additionally, or alternatively, in some embodiments, a fourth real-time dynamic picture associated with the second camera 114 is presented in the fourth shooting window 390. For example, the fourth real-time dynamic picture may include a real-time picture of the user 140's face.

In some embodiments, the third shooting window 380 is provided with a zoom multiple control 328 for zooming the first scene. Additionally, or alternatively, a zoom multiple function (not shown) is also set in the fourth shooting window 390 for scaling the second scene.

Similar to the first shooting page 300, a shooting control for the third shooting page 370, such as the shooting control 320, may also be provided. The shooting control 320 is configured to capture an image, such as a static image or a dynamic image. In some embodiments, if a predetermined operation of the shooting control 320 is detected while the third shooting page 370 is presented, the first camera 112 and the second camera 114 perform synchronous image shooting.

In some embodiments, the first camera 112 and the second camera 114 are configured to take static images. In this example, by performing some predetermined operation (e. g., clicking, etc.) on the shooting control 320, the first camera 112 and the second camera 114 may simultaneously capture static images.

Alternatively, or in addition, in some embodiments, the first camera 112 and the second camera 114 are configured to take dynamic images. In this example, by performing some predetermined operation on the shooting control 320, such as continuous pressing on the shooting control 320 within a certain period of time, the first camera 112 and the second camera 114 may simultaneously capture dynamic images within that period of time.

In some embodiments, one of the first camera 112 or the second camera 114 is configured to take a static image, while the other camera is configured to take a dynamic image. In this example, by performing some predetermined operation on the shooting control 320, such as continuously pressing the shooting control 320 within a certain time period, one of the cameras may capture a static image at a certain time point within the time period, while the other camera may capture a dynamic image within the time period.

In some embodiments, the first camera 112 and the second camera 114 are configured to capture a default image type, such as a static image or a dynamic image. Alternatively, or in addition, the type of image captured by the first camera 112 and/or the second camera 114 may be set or switched by the user 140. The scope of this disclosure is not limited in this respect.

It is to be understood that the various operations on the shooting control 320 described above are merely exemplary. Various operation modes may be adopted for the shooting control 320. In some embodiments, the first camera 112 and the second camera 114 may be triggered in other ways for synchronous shooting in addition to or as an alternative to the predetermined operation of the shooting control. Examples of other triggering methods include, but are not limited to, voice control instructions, predetermined operations of hardware keys, specific gestures on specific pages (for example, sliding gestures), and so on. The scope of this disclosure is not limited in this respect.

In some embodiments, the third shooting page 370 is provided with a camera flip control 324 for switching positions of the third shooting window 380 and the fourth shooting window 390. For example, if the user 140 performs a predetermined operation (such as clicking or selecting) on the camera flip control 324, the terminal device 110 may exchange the first camera 112 and the second camera 114. In other words, the terminal device 110 may switch the positions of the third shooting window 380 and the fourth shooting window 390.

In addition, or alternatively, in some embodiments, if the terminal device 110 detects a predetermined operation of the third shooting window 380 or the fourth shooting window 390, it is also possible to switch the positions of the third shooting window 380 and the fourth shooting window 390. For example, if the user 140 clicks on the fourth shooting window 390, the terminal device 110 may switch the positions of the third shooting window 380 and the fourth shooting window 390.

It is to be understood that the predetermined operation of the camera flip control 324 or the fourth shooting window 390 listed herein is only exemplary, not limiting. Any predetermined operation may be used to cause the terminal device 110 to switch the positions of the third shooting window 380 and the fourth shooting window 390.

Additionally, or alternatively, in some embodiments, other functions, such as exit option 301, flash control control 322, and the like, may also be set in the third shooting page 370. These controls, functions, etc. on the third shooting page 370 are similar to those on the first shooting page 300, and will not be repeated here. It is to be understood that the controls or functions shown here are only examples. Different numbers of controls and/or functions can be provided in the third shooting page 370. The scope of this disclosure is not limited in this regard.

The third shooting page 370 for synchronous shooting mode is described above with respect to FIG. 3C. By presenting the third shooting page, the user 140 can be guided to perform synchronous shooting of multiple cameras. For example, if the user 140 views a plurality of shooting windows corresponding to different cameras, the user 140 can adjust the content presented in each shooting window, so as to capture a better and mutually matched plurality of different images.

Asynchronous shooting mode and synchronous shooting mode of multiple cameras have been described above. By using an asynchronous shooting mode or a synchronous shooting mode, the terminal device 110 can acquire a plurality of images captured by a plurality of cameras. These images can be captured almost simultaneously or in real time. Using these near real-time or real-time captured multiple images, the terminal device 110 can present a composite image obtained by combining these images to the user 140. In this way, richer video content can be provided for sharing.

For example, when a user goes out to play or visit scenic spots, he or she is likely to capture both a clear image of a beautiful scenery in distance and a clear facial image of the user. With the conventional single camera shooting method, it can only use the self-timer function to capture images including the user's face and local environment. The scope of the local environment is often difficult to select. That is, it is impossible to capture a large range of environmental images. By using this solution, users can use multiple cameras to capture the desired content. For example, the user can use the front camera to take a self-portrait of the user himself or herself, and use the rear camera to take an image of the user's current environment.

The asynchronous shooting mode and synchronous shooting mode of multiple cameras are described above with respect to FIG. 2 and FIGS. 3A to 3C. In some embodiments, multiple images captured by multiple cameras may be posted or shared. Example pages for various multi camera shooting and image posting according to some embodiments of the present disclosure will be described below in conjunction with FIGS. 4A to 8K. In these pages, some graphic elements similar to those in FIGS. 3A to 3C are presented, such as controls, functions, etc. This similar graphic element will not be described in detail here. It is to be understood that each page in these drawings and other drawings is only an example page, and various page designs may exist in practice. Various graphical elements in the page may have different arrangements and different visual representations, where one or more of them may be omitted or replaced, and one or more other elements may further exist. The scope of this disclosure is not limited in this respect.

FIGS. 4A to 4D show an example first shooting page 400 related to asynchronous image shooting. The first shooting page 400 includes a first shooting window 410. In the illustrated example, the first camera 112 is a front camera. The first shooting window 410 is a front view window.

For example, in the example where the first camera 112 is a front camera by default, if the asynchronous shooting mode is activated, the first shooting page 400 is presented. If the first camera 112 is a rear camera by default, the terminal device 110 presents a shooting page such as the first shooting page 300. By performing a predetermined operation (e. g., clicking, double clicking, pressing, etc.) on the camera flip control 324 in the first shooting page 300, the first shooting page 400 may be presented.

In the first shooting page 400, in addition to graphic elements such as the shooting control 320 similar to those in FIG. 3A, a text prompt 432 may also be displayed. As an example, the text prompt 432 may include "take now" or other appropriate words, symbols or labels. It is to be understood that the text prompt 432 may include any language, such as Chinese, English, and so on. By presenting a text prompt 432, the user 140 can know that an image is currently to be captured.

Alternatively, or in addition, in some embodiments, in the first shooting page 400, a countdown 434 (also referred to as a second countdown) is also presented. The countdown 434 may be used to prompt the user 140 to complete the shooting before the countdown expires. Alternatively, the countdown 434 may be used to prompt the user 140 to complete the post of an image before the countdown expires. As an example, in some embodiments, the countdown 434 may have an initial duration of, for example, 2 minutes, 1 minute, 30 seconds, or other appropriate length. By presenting the countdown 434, the user 140 can know how much time is left for image shooting or image posting. By limiting the duration for image shooting or image posting, it can ensure that multiple images captured by multiple cameras are substantially real-time contents captured within a certain period of time.

In some embodiments, if the terminal device 110 detects a first predetermined operation on the shooting control 320 at a first time point, the terminal device 110 causes the first camera 112 to capture a first picture as a response to the first predetermined operation. The first picture may be used as the first image. The duration of the first predetermined operation is below the threshold duration. The threshold duration may be preset. The threshold duration may also be selected or modified by the user 140. As an example, the threshold duration may be, for example, 0.5 seconds, 1 second, or other appropriate duration. For example, examples of the first predetermined operation may include, but are not limited to, clicking, double clicking, touching, or other appropriate operations on the shooting control 320.

Figure 4A:
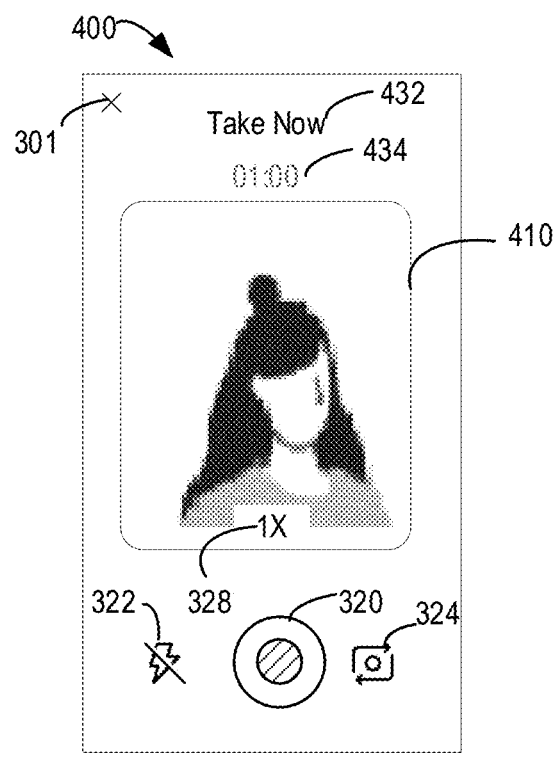
FIGS. 4A to 4K illustrate schematic views of example pages related to asynchronous image shooting according to some embodiments of the present disclosure.
Figure 4B:
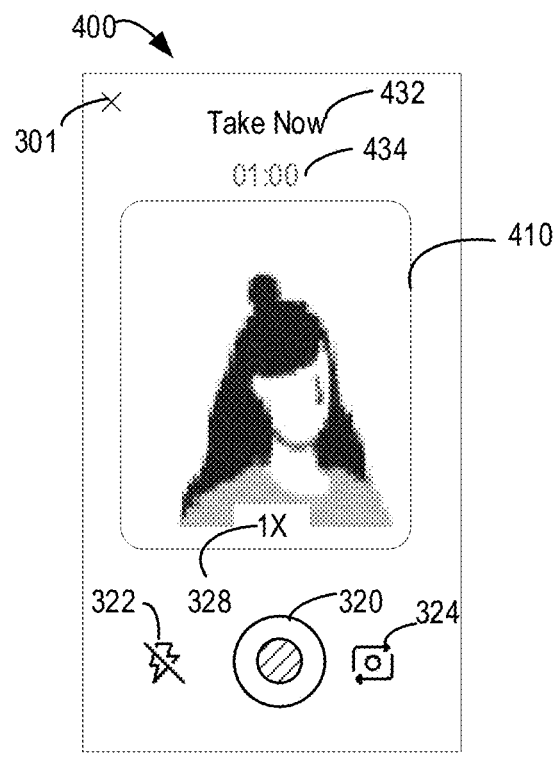
Figure 4C:
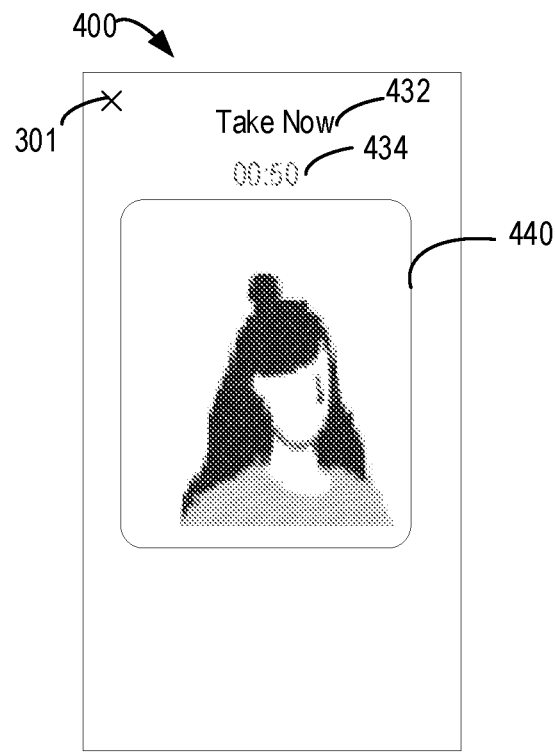
Figure 4D:
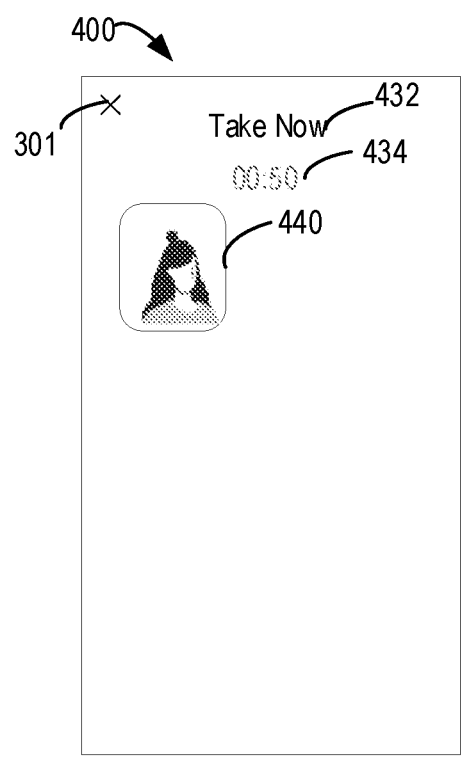

Taking the first predetermined operation including the click of the user 140's finger 436 on the shooting control 320 as an example, as shown in FIG. 4B, the terminal device 110 detects the first predetermined operation at the first point at which the countdown 434 is 0 minutes and 50 seconds. In FIG. 4C, the terminal device 110 causes the first camera 112 to capture the first picture. In addition, the terminal device 110 may present the first image window 440 in the first shooting page 400 to present a preview of the first picture. In addition, or alternatively, as shown in FIG. 4D, the first image window 440 may have a reduced size.

Figure 4E:
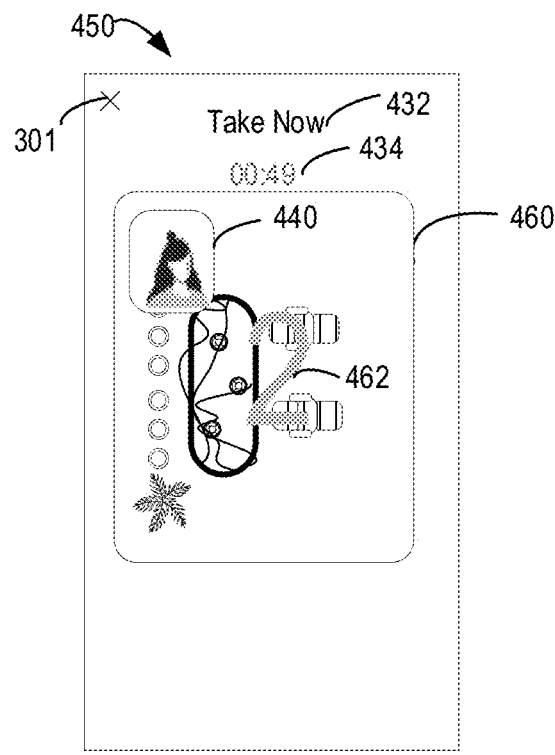
Figure 4F:
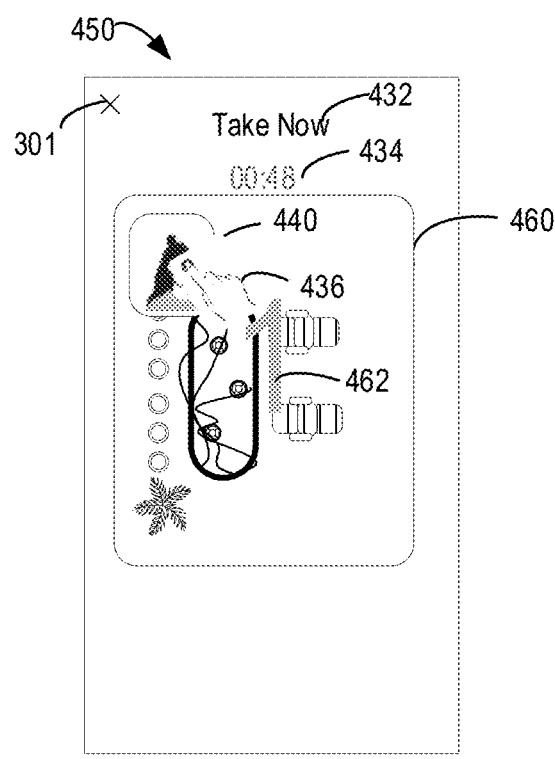
Figure 4G:
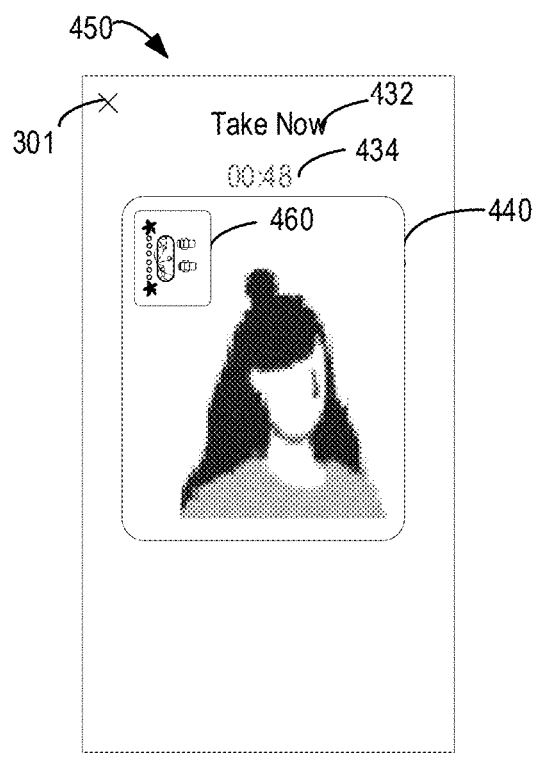
Figure 4H:
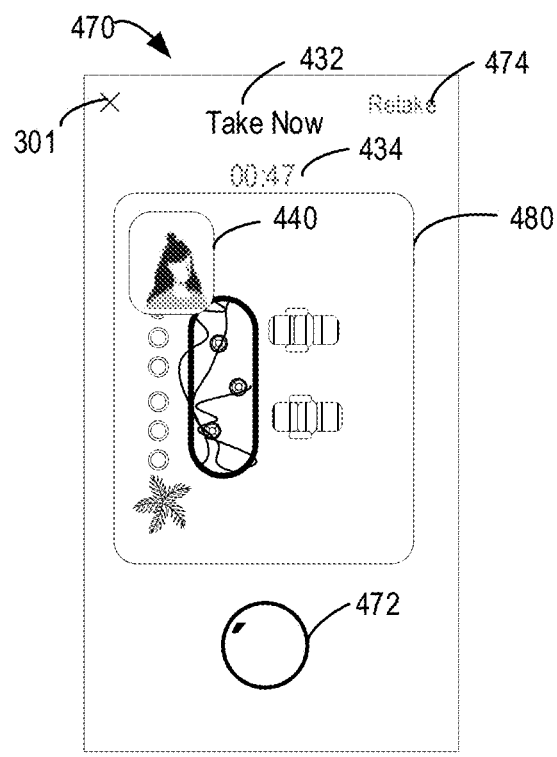

As previously described, if the first camera 112 has completed shooting of the first image (in this example, the first picture), the second shooting page is displayed. FIGS. 4E to 4G show an example second shooting page 450 related to asynchronous image shooting. A first image window 440 and a second image window 460 are displayed in the second shooting page 450. In this example, the second camera 114 is a rear camera. The second shooting window 460 is a rear-view window.

In some embodiments, a second picture is captured at a second time point by the second camera 114. The second picture may be used as the second image. The second time point is after a first predetermined time duration from the first image being captured. The first predetermined duration may be preset. For example, the first predetermined duration may be set by system. Alternatively, in other embodiments, the first predetermined duration may also be set or modified by user 140. As an example, the first predetermined duration may be, for example, 2 seconds, 3 seconds or other appropriate duration. In this example of automatically capturing a second picture by the second camera 114, graphic elements such as the capture control 320 may not be presented in the second shooting page 450.

Additionally, or alternatively, in some embodiments, a countdown 462 (also referred to as a first countdown) with respect to the first predetermined duration is presented in association with the second shooting window 460. The countdown 462 is used to prompt the user 140 that the second camera 114 will shoot the second image. For example, taking the time length of the countdown 462 has 2 seconds as an example, the countdown 462 with the value "2" in FIG. 4E overlaps on the second shooting window 460. In FIG. 4F, the value of countdown 462 becomes "1". If the countdown 462 expires, the second camera 114 will capture a second picture. It is to be understood that the size, color, position, etc. of the display of the illustrated countdown 462 are only exemplary. The countdown 462 may be displayed in other forms.

By presenting the countdown 462, the user 140 can know when the second image will be captured. In this way, the user 140 can be prepared for shooting in advance, for example, to put on a better expression or posture. On the other hand, by automatically capturing the second image at the second time point with the second camera 114, it is possible to ensure that the time for capturing the first and second images is close enough. In this way, it is possible to make the first and second images almost two images captured at the same time.

In the example of FIG. 4F, the first image window 440 overlaps on the second shooting window 460 at a reduced size. In some embodiments, the size of the first image window 440 may be preset or may be adjusted by the user 140. For example, the user 140 may enlarge the size of the first image window 440 by performing predetermined operations on the first image window 440, such as finger dragging, predetermined gestures, voice control, and the like.

In some embodiments, if a window switch command is detected when the second shooting page 450 is presented, the terminal device 110 is positioned in the second shooting page 450. For example, an example of the window switch command may include a predetermined operation (also referred to as a fifth predetermined operation) for the second shooting window 450 or the first image window. Taking the clicking of the first image window 440 by the finger 436 of the user 140 as the fifth predetermined operation, as shown in FIG. 4F, the terminal device 110 detects the fifth predetermined operation. In this case, the terminal device 110 will exchange the positions of the second shooting window 460 and the first image window 440 presented in the second shooting page 450, as shown in FIG. 4G.

It is to be understood that, although the camera flip control 324 is not shown in the second shooting page 450 in the example of FIG. 4F, in the example of presenting the camera flip control 324 in the second shooting page 450, the positions presented by the second shooting window 460 and the first image window 440 in the second shooting page 450 may also be exchanged by a predetermined operation (also known as a sixth predetermined operation) of the camera flip control 324.

In some embodiments, if the second camera 114 completes capturing the second image, the terminal device 110 presents the first and second images on the post page. One of the first or second image at least partially overlaps on the other image. FIGS. 4H to 4K show schematics of an example post page 470. On the post page 470, the first image window 440 and the second image window 480 are presented. The first image window 440 includes the first image captured by the first camera 112. The second image window 480 includes the second image captured by the second camera 114. In the post page 470, the first image window 440 at least partially overlaps on the second image window 480.

In some embodiments, a retake control is provided for the post page 470, such as the retake control 474 presented in the post page 470. If the terminal device 110 detects a predetermined operation (e. g., selection, clicking, touching, etc.) on the retake control 474, it will return to the first shooting page 400 to retake image shooting. In some embodiments, if the terminal device 110 detects a predetermined operation of the retake control 474, the terminal device 110 will present a confirmation page to the user 140. On this confirmation page, the user 140 may select whether to confirm that a retake is to be performed. By presenting the confirmation page, the user 140 can avoid invalidating the captured image due to incorrect operation. On this confirmation page, a post option may be provided. If the user 140 selects the post option in the confirmation page, the composite image obtained by combining the first and second images may be posted.

Additionally, or alternatively, in some embodiments, a post control for post page 470, such as post control 472, is also provided. If the terminal device 110 detects a predetermined operation (for example, selection, clicking, touching, etc.) on the post control 472, the terminal device 110 will post a composite image (also called a combined image) obtained by combining a first image (in this example, a first picture) and a second image (in this example, a second picture). The composite image has the same content and layout as that presented by the first image window 440 and the second image window 480 in the current post page 470.

Figure 4I:
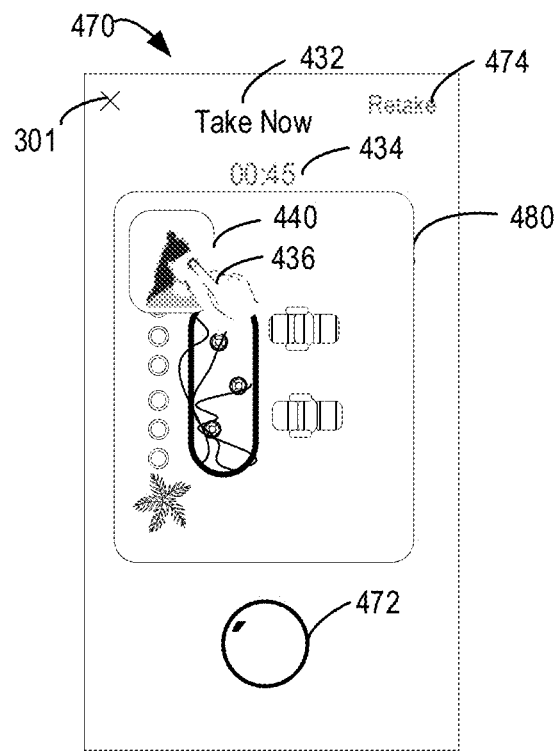
Figure 4J:
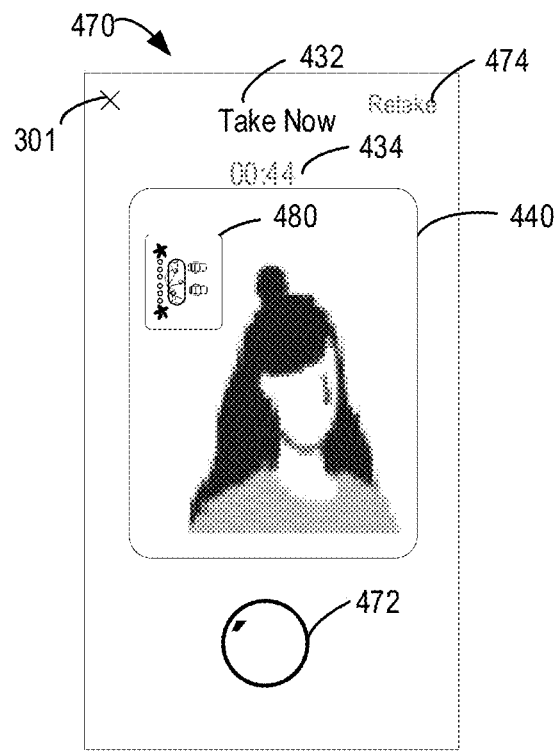
Figure 4K:
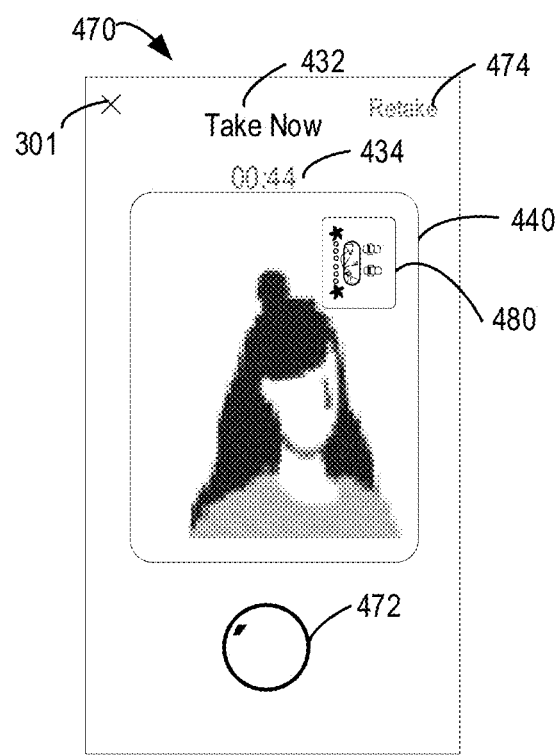

In addition, or alternatively, in some embodiments, if a fourth predetermined operation for the first image (or the first image window 440) or the second image (or the second image window 480) is detected when the post page 470 is presented, the positions presented by the first and second images in the post page 470 are exchanged. In the example of FIG. 4I, the fourth predetermined operation is the touch or click of the user 140's finger 436 on the first image window 440. If the terminal device 110 detects the fourth predetermined operation, the first image window 440 is exchanged with the second image window 480, as shown in FIG. 4J.

In some embodiments, if the movement operation of at least one image (or image window) of the first image (or the first image window 440) or the second image (or the second image window 480) is detected while the post page 470 is presented, the position or size of the at least one image (or image window) presented on the post page 470 is adjusted. For example, if a moving operation (not shown) from the left side to the right side of the second image window 480 is detected on the post page 470 shown in FIG. 4J, the position of the second image window 480 displayed in the post page 470 will be adjusted to the position shown in FIG. 4K. The movement of the display position may correspond to the detected movement of the second image window 480.

In addition, or alternatively, if other predetermined operations for at least one image (or image window) of the first image (or the first image window 440) or the second image (or the second image window 480) are detected while the post page 470 is presented, such as finger scaling and dragging operations for the second image window 480, the position and/or size presented by the second image window 480 can be changed according to the predetermined operations. For example, the second image window 480 is scaled and displayed according to the scale of the user's finger scaling and dragging. By changing the layout of each image according to a predetermined operation on each image, such as a mobile operation, the user 140 can flexibly change the layout of each image in the post page.

By exchanging the first image window 440 with the second image window 480 or adjusting the position or size of the first image window 440 with the second image window 480, a certain image to be wanted to view may be zoomed in and viewed. In this way, the user 140 can determine whether he or she is satisfied with the first and second images before posting the image.

As previously described, the countdown 434 may be used to prompt the user 140 to capture or post an image. In the example post page 470 of FIGS. 4H to 4K, the countdown 434 is still presented. In this example, the countdown 434 may be used to prompt the user 140 to post the image. For example, the user 140 may post a composite image obtained by synthesizing the first and second images. In such an example, the text prompt 432 in the post page 470 may be different from the illustration. For example, the text prompt 432 may be changed into other appropriate text content such as "post now". Alternatively, in other embodiments, the countdown 434 may no longer be displayed in the post page 470. In such a scene, the countdown 434 may only be used to prompt the user 140 to capture an image.

It is to be understood that the values of countdown 434 shown in FIGS. 4A to 4K and other example pages below are only exemplary. The countdown 434 may have other appropriate values.

It is to be understood that, although in the example described above with respect to FIGS. 4A to 4K, the resultant image may be directly posted, in some embodiments, the terminal device 110 may also perform various edits on the resultant image before posting it. For example, the composite image may be cropped, intercepted, filters added, text or expression illustrations added, and so on. There are no restrictions on the way to edit the composite image. In this way, richer image content can be provided for sharing.

Figure 5A:
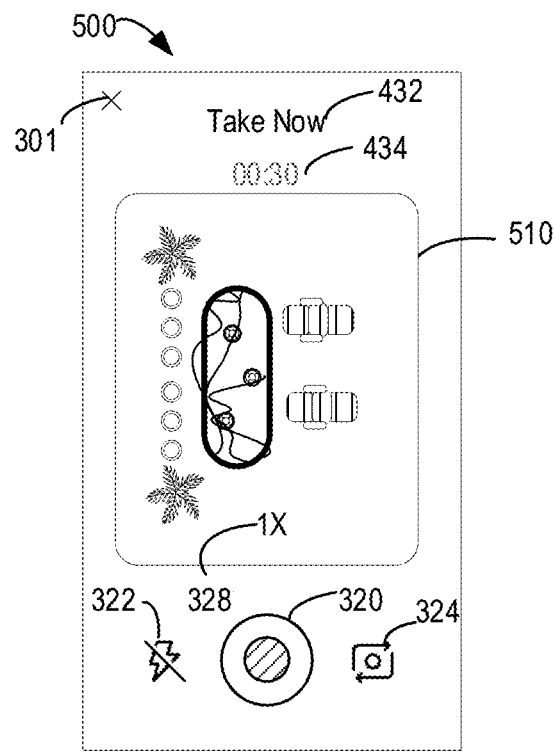
FIGS. 5A to 5F illustrate schematic views of example pages related to asynchronous image shooting according to other embodiments of the present disclosure.
Figure 5B:
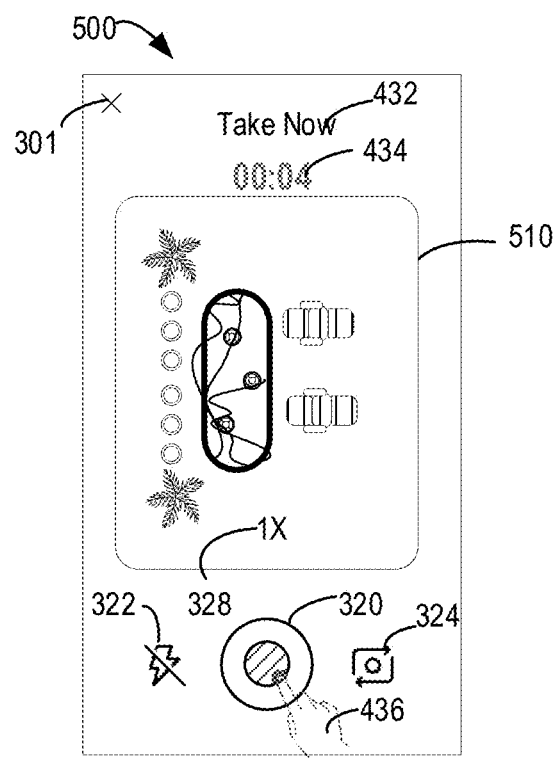
Figure 5C:
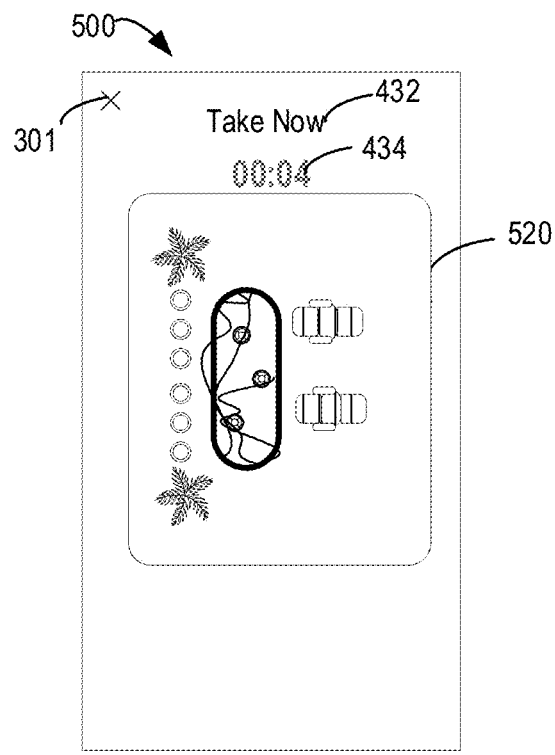

FIGS. 5A to 5C show an example first shooting page 500 related to asynchronous image shooting. Similar to the first shooting page 400 in FIG. 4A, the first shooting page 500 includes a first shooting window 510. Unlike the example of FIG. 4A, in the example of FIG. 5A, the first camera 112 is a rear camera. The first shooting window 510 is a rear-view window.

For example, in the example where the first camera 112 is a rear camera by default, if the asynchronous shooting mode is activated, the first shooting page 500 is presented. In the example where the first camera 112 defaults to be a front camera, the terminal device 110 presents a shooting page such as the first shooting page 400. By performing a predetermined operation on the camera flip control 324 in the first shooting page 400, the first shooting page 500 may be presented.

In the first shooting page 500, graphic elements similar to those in the first shooting page 400 are displayed. These similar graphic elements will not be described again here.

In some embodiments, if the remaining duration of the countdown 434 is below the second predetermined duration, the terminal device 110 may highlight the countdown 434. The second predetermined duration may be preset. For example, the second predetermined duration may be set by system, or may also be set or modified by the user 140. As an example, the second predetermined duration may be 10 seconds, 30 seconds or other appropriate duration). In FIG. 5B, the countdown 434 is magnified and bold to show clearly.

Additionally, or alternatively, in some embodiments, if the countdown 434 expires, the duration of expiration of the countdown 434 may also be highlight. For example, in the example of FIG. 5F, the countdown 434 is shown as "+00: 01" in bold and enlarged to remind the user that the countdown of 140 has expired for 1 second. In this case, the terminal device 110 will not exit the current shooting process. That is, the current shooting page or shooting window will not be closed. Alternatively, or in addition, in some embodiments, if the countdown 434 expires, the current shooting process may be exited.

In the above example, the countdown 434 is highlighted by thickening and enlarging the display of the countdown 434. Additionally, or alternatively, the countdown 434 can also be prominently displayed by displaying it in red or highlighting it. It is to be understood that the countdown 434 may be prominently displayed in various appropriate ways, and the scope of the present disclosure is not limited in this regard. It is to be understood that this way of prominently displaying the countdown with a short remaining time length may also be applied to other examples in the present disclosure, such as the examples in FIGS. 4A to 4K.

Alternatively, or in addition, in some embodiments, if the remaining duration of the countdown 434 is below the second predetermined duration, the terminal device 110 may also provide tactile feedback to the user 140. For example, tactile feedback such as vibration may be provided to the user 140 via the terminal device 110 at predetermined time intervals (e. g., 1 second or other time intervals). By highlighting the countdown 434 and/or providing tactile feedback when the remaining time of the countdown 434 is short, the user 140 can be reminded to seize the time to complete the image shooting.

As previously mentioned, if the terminal device 110 detects a first predetermined operation on the shooting control 320 at the first time point, the terminal device 110 causes the first camera 112 to capture the first picture as the first image as a response to the first predetermined operation. The duration of the first predetermined operation is below the threshold duration.

Taking the first predetermined operation including the click of the user 140's finger 436 on the shooting control 320 as an example, FIG. 5B shows that the terminal device 110 detects the first predetermined operation at the first time point when the countdown 434 is 0 minutes and 4 seconds. In FIG. 5C, the terminal device 110 causes the first camera 112 to capture the first picture. In addition, the terminal device 110 may present the first image window 520 in the first shooting page 500 to present a preview of the first picture. In some embodiments, the size of the first image window 520 is the same as that of the first shooting window 510. Additionally, or alternatively, in some embodiments, the size of the first image window 520 is different from that of the first shooting window.

Figure 5D:
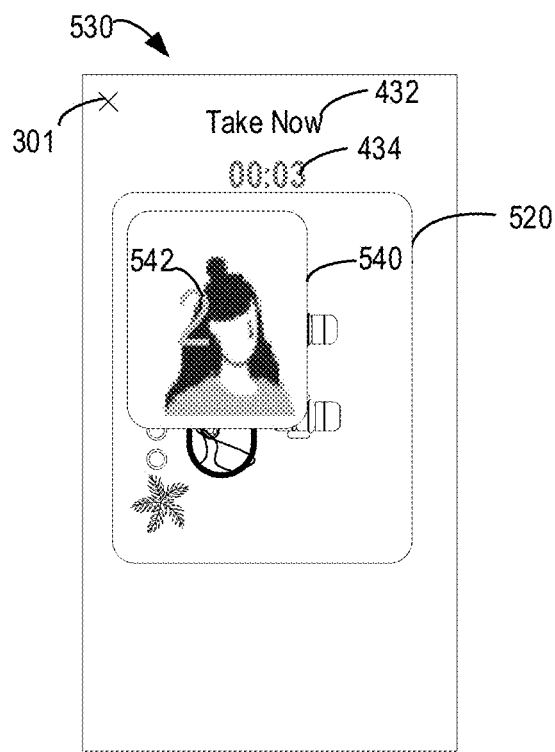

As previously described, if the first camera 112 has completed shooting of the first image (in this example, the first picture), the second shooting page is displayed. FIG. 5D shows an example second shooting page 530. A first image window 520 and a second image window 540 are displayed in the second shooting page 530. In this example, the second camera 114 is a front camera. The second shooting window 540 is a front-view window.

In some embodiments, the second camera 114 captures the second picture as the second image at the second time point. A second time point is after a first predetermined time duration from the first picture being captured. In this example where the second picture is automatically captured by the second camera 114, graphic elements such as the capture control 320 may not be presented in the second shooting page 530.

Additionally, or alternatively, in some embodiments, a countdown 542 related to the first predetermined duration is presented in association with the second shooting window 540. The countdown 542 is used to prompt the user 140 that the second camera 114 will shoot the second image. For example, taking the time length of the countdown 542 has 2 seconds as an example, countdown 542 with the value "2" in FIG. 5D overlaps on the second shooting window 460. If the countdown 542 expires, the second camera 114 will capture a second picture. It is to be understood that the size, color, position, and the like of the illustrated countdown 542 are only exemplary. The countdown 542 may be displayed in other forms.

By presenting the countdown 542, the user 140 can know when the second picture will be captured. In this way, the user 140 can be prepared for shooting in advance, for example, to put on a better expression or posture. On the other hand, by automatically capturing the second image at the second time point with the second camera 114, it is possible to ensure that the time for capturing the first and second images is close enough. In this way, it is possible to make the first and second images almost two images captured at the same time.

In the example of FIG. 5D, the first image window 520 is presented in a first size, and the second shooting window 540 overlaps on the first image window 520 in a second size smaller than the first size. In some embodiments, the size of the second shooting window 540 may be preset or adjusted by the user 140. Additionally, or alternatively, in some embodiments, the positions presented in the second shooting page 530 by the first image window 520 and the second shooting window 540 may also be exchanged in response to window switch commands. For example, if the terminal device 110 detects a predetermined operation (e. g., clicking, etc.) on the second shooting window 540, the positions presented by the first image window 520 and the second shooting window 540 may be exchanged.

The user 140 may view the scene captured by the second camera 114 in a larger window by adjusting the size of the second shooting window 540 (for example, enlarging), or by exchanging the positions presented by the first image window 520 and the second shooting window 540. In this way, the user 140 can view the content to be shot more clearly so as to be ready for shooting.

Figure 5E:
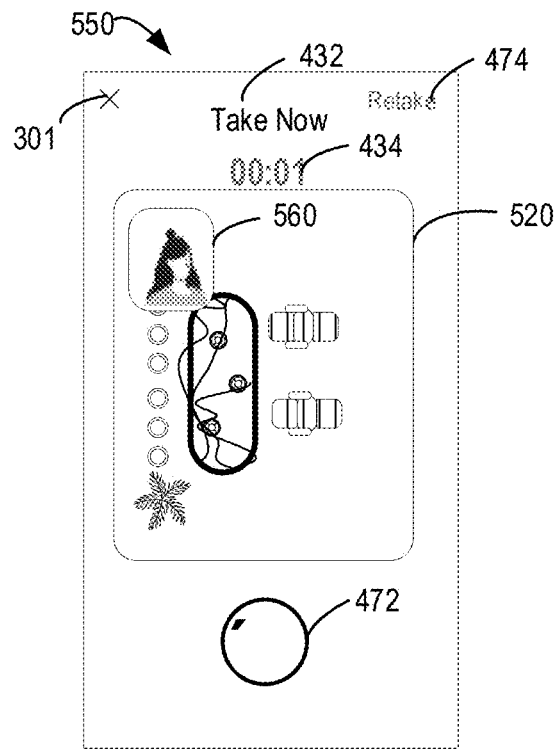

In some embodiments, if the second camera 114 completes capturing the second image, the terminal device 110 presents the first and second images in the post page. One of the first or second image at least partially overlaps on the other image. FIG. 5E shows a schematic diagram of an example post page 550. On the post page 550, the first image window 520 and the second image window 560 are presented. The first image window 520 includes a first picture captured by the first camera 112. The second image window 560 includes a second picture captured by the second camera 114. Graphic elements similar to the post page 470 are presented in the post page 550. These graphic elements will not be described again here.

In the post page 550, the first image window 520 is presented in a first size, and the second image window 560 overlaps on the first image window 520 in a third size smaller than the first size. The third size is smaller than the second size of the second shooting window 540 in FIG. 5D. Similar to the post page 470, the first image window 520 and the second image window 540 in the post page 550 may also be exchanged based on window switch commands. By exchanging the first image window 520 with the second image window 540, an image to be viewed can be enlarged for viewing. In this way, the user 140 can determine whether he or she is satisfied with the first and second images before posting the images.

Additionally, or alternatively, the position or size of the first image window 520 or the second image window 540 presented in the post page 550 may be changed according to a predetermined operation (e. g., moving, dragging, zooming, etc.) on the first image window 520 or the second image window 540. In this way, the user 140 can flexibly change the layout of each image in the post page.

In the example of FIG. 5E, although the first image window 520 may have different sizes in the post page 550 and the second shooting page 530, the shapes and layouts of the first image window 520 and the second image window 560 in the post page 550 are similar to those of the first image window 520 and the second shooting window 540 in the second shooting page 530. Additionally, or alternatively, in some embodiments, the first image window and/or the second image window in the post page may have a shape and layout different from the shape and layout of the first image window 520 and the second image window 540 in the second shooting page 530.

Figure 5F:
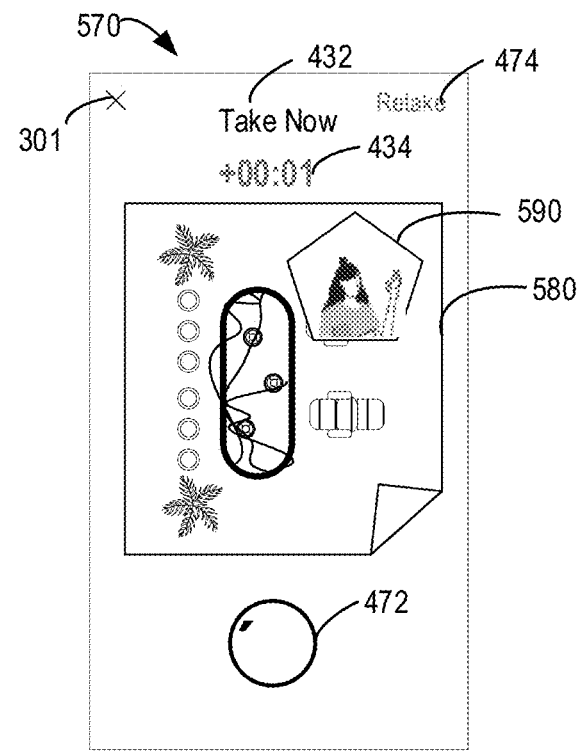

FIG. 5F shows another example post page 570. A first image window 580 and a second image window 590 are displayed in the post page 570. For example, the first image window 580 may include a rectangular shape with corners, and the second image window 590 may include a pentagon shape. The second image window 590 may overlap the upper right position of the first image window 580 instead of the upper left position in the example of FIG. 5E. Additionally, or alternatively, in some embodiments, the first image window 580 and the second image window 590 may also be presented without overlapping each other.

It is to be understood that the shape, size and layout of each example image window in FIG. 5F are only exemplary. The first image window 580 and the second image window 590 may be set with any suitable shape, size, and layout. By using flexible shapes and layouts to set up image windows, more interesting composite images may be posted. In this way, the user's sense of experience can be further improved.

It is to be understood that, in some embodiments, in addition to the shape, size and layout of each image window may be changed, the shape, size and layout of each shooting window (for example, the first shooting window or the second shooting window) may also be changed. The scope of this disclosure is not limited in this respect.

In some embodiments, if the terminal device 110 detects a predetermined operation (for example, selection, clicking, touching, and so on) on the post control 472, the terminal device 110 may post the composite image obtained by combining the first and second images. The composite image has the same content and layout as that presented by the first image window and the second image window on the post page 550 or 570.

It is to be understood that, although in the example described above with respect to FIGS. 5A to 5F, the resultant image may be directly posted, in some embodiments, the terminal device 110 may also perform various edits on the resultant image before posting it. For example, the composite image can be cropped, intercepted, filters added, text or expression illustrations added, and so on. There are no restrictions on the way to edit the composite image. In this way, richer video content can be provided for sharing.

With respect to FIGS. 4A to 5F, several example processes of multi-image shooting and posting by asynchronous shooting mode are described above. In some embodiments, asynchronous image shooting may be performed by multiple cameras. The process of multi camera asynchronous image shooting may be similar to the asynchronous image capture process described above.

Additionally, or alternatively, in some embodiments, mixed shooting of static images (i.e., images) and dynamic images (i.e., videos) may be performed by an asynchronous shooting mode. Several examples of mixed shooting of different video types by asynchronous shooting mode will be described with respect to FIGS. 6A to 6F and FIGS. 7A to 7I below.

Figure 6A:
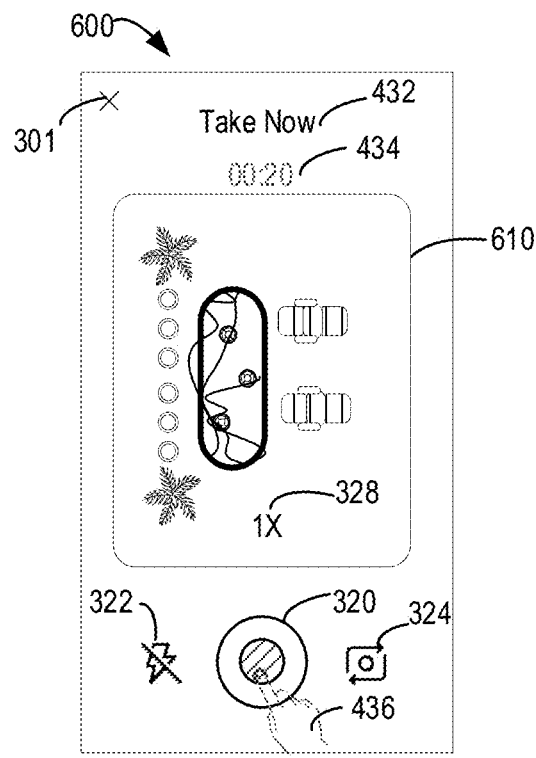
FIGS. 6A to 6F illustrate schematic views of example pages related to asynchronous image shooting according to other embodiments of the present disclosure.
Figure 6B:
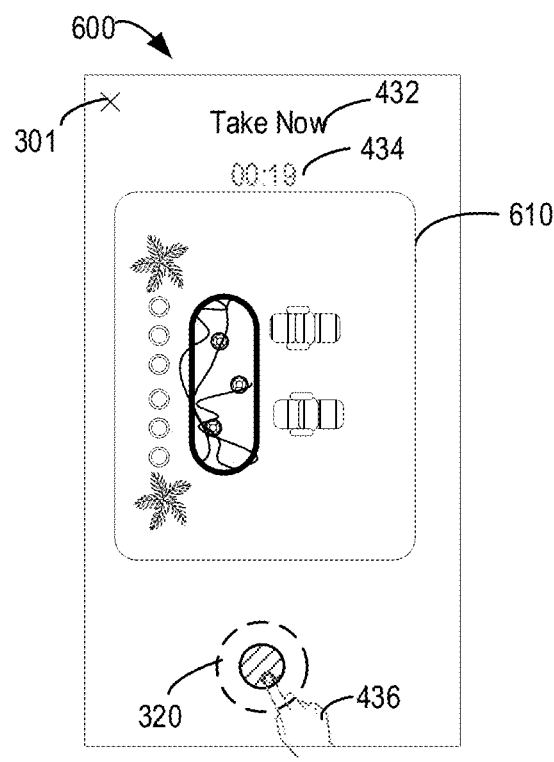
Figure 6C:
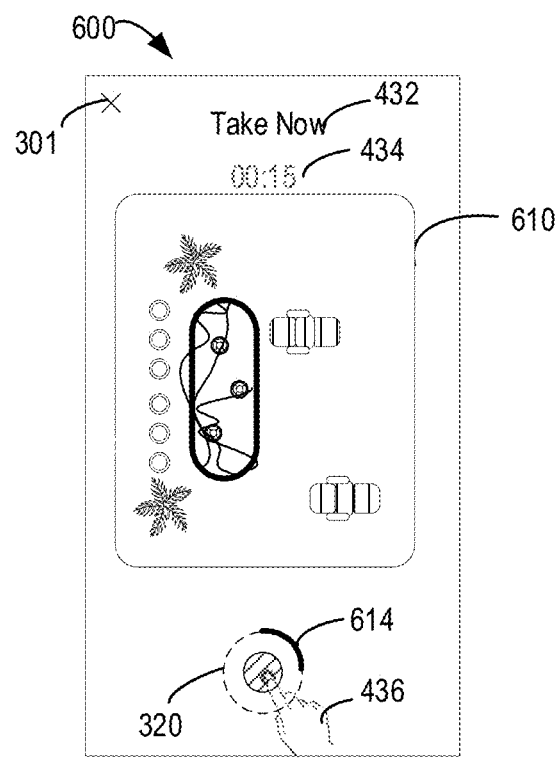

FIGS. 6A to 6C show an example first shooting page 600 for mixed shooting in asynchronous shooting mode. The first shooting page 600 is similar to the first shooting page 500. Similar graphic elements between the two will not be described repeatedly. The first shooting page 600 includes a first shooting window 610. In the example of FIG. 6A, the first camera 112 is a rear camera. The first shooting window 410 is a rear-view window.

In some embodiments, if the terminal device 110 detects a second predetermined operation on the shooting control 320 where the second predetermined operation starts at a second time point and ends at a third time point and a time duration of the second predetermined operation exceeds a threshold time duration, a first video is captured by the first camera 112 within the time period defined by the second time and the third time. The first video may be used as the first image. The threshold duration may be preset or set or modified by the user 140. As an example, the threshold duration may be, for example, 0.5 seconds, 1 second, or other appropriate duration.

The second predetermined operation may be continuous pressing of the shooting control 320 for an ultra multi threshold duration or other appropriate operation. The first video may be captured by the first camera 112 within a time period defined by the third time point and a time point at which the second predetermined operation exceeds the threshold duration.

Specifically, in some embodiments, if the terminal device 110 detects that the duration of the second predetermined operation exceeds the threshold duration, the terminal device 110 determines that the current shooting mode is a mixed shooting mode of image and video. For example, if in the example of FIG. 6A, the terminal device 110 detects that the continuous pressing of the user 140's finger 436 on the capture control 320 exceeds the threshold duration, the terminal device 110 determines that the current shooting mode is a mixed shooting mode of image and video.

As shown in FIG. 6B, in the mixed shooting mode, only the shooting control 320 will be displayed in the first shooting page 600, and no other functional controls will be displayed (such as flash control control 322, camera flip control 324, and so on). In some embodiments, as shown in FIG. 6B, the shooting control 320 presented in the first shooting page 600 may have a different appearance. By changing the appearance of the capture control 320, the user 140 may be prompted that video capture is in progress instead of static image capture. In the illustrated video capture process, the finger 436 of the user 140 is pressed on the capture control 320 all the time.

In addition, or alternatively, in some embodiments, as shown in FIG. 6C, a shooting progress bar 614 is also displayed in the first shooting page 600. For example, in some embodiments, a maximum duration may be set for the captured video. The shooting progress bar 614 may indicate a proportion of the currently captured video length to the maximum duration. For example, if the maximum duration is 15 seconds and the current shooting time is 4 seconds, the shooting progress bar 614 displays an arc of about a quarter, as shown in FIG. 6C. It is to be understood that the size of the maximum duration listed above is only exemplary, and other appropriate maximum durations can be adopted.

In some embodiments, the maximum duration of the captured video may not be set. It is to be understood that the illustrated shooting progress bar 614 is only exemplary, and shooting progress bar 614 of other shapes and sizes may be used. By presenting the progress bar 614, the user 140 can know the current shooting progress.

By presenting the shooting progress bar 614, the user 140 can know that shooting is to be completed within the specified maximum video length. In other words, the user 140 can stop the second prediction operation of the shooting control 320 before the progress bar 614 fills the entire circle, so that the first camera 112 can finish shooting of the first video.

As previously described, if the first camera 112 has completed shooting of the first image (in this example, the first video), the second shooting page is displayed. For example, user 140 will stop the second predetermined operation at the time point shown in FIG. 6C (i.e., the third time point). In other words, the first camera 112 will complete shooting of the first video at the time shown in FIG. 6C.

Figure 6D:
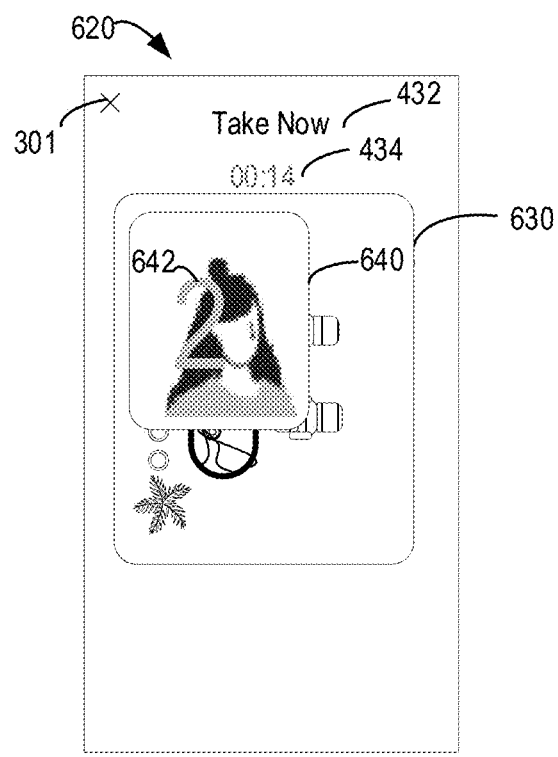

In some embodiments, in response to the first camera 112 complete shooting of the first video, the terminal device 110 will present the second shooting page 630 shown in FIG. 6D. A first image window 630 and a second shooting window 640 are displayed in the second shooting page 620. The first image window 630 includes a first video captured by the first camera 112. For example, a preview image or initial view of the first video may be presented in the first image window 630. For example, in other embodiments, it is also possible to play a dynamic picture of the first video in the first image window 630 instead of presenting a fixed image. In this example, the second camera 114 is a front camera. The second shooting window 640 is a front-view window.

In some embodiments, the second camera 114 captures a third picture at a fourth time point. The third picture may be used as the second image. The fourth time point is a predetermined time duration (for example, the first predetermined length) from the third time point. The predetermined duration may be a preset duration. For example, the predetermined duration may be set by system. Alternatively, in other embodiments, the predetermined duration may also be selected or changed by the user 140. In this example of automatically capturing a third image by the second camera 114, graphic elements such as the capture control 320 may not be presented in the second shooting page 620.

Additionally, or alternatively, in some embodiments, a countdown 642 related to the first predetermined duration is presented in association with the second shooting window 640. The initial duration of countdown 642 may be the first predetermined duration. The countdown 642 is used to prompt the user 140 that the second camera 114 will shoot the second image. For example, taking the countdown 642 with an initial duration of 2 seconds as an example, the countdown 642 with the value "2" in FIG. 6D overlaps on the second shooting window 640. If the countdown 642 expires, the second camera 114 will capture the third picture. It is to be understood that the size, color, position, etc. of the illustrated countdown 642 are only exemplary. The countdown 642 may be displayed in other forms.

By presenting the countdown 642, the user 140 can know when the third picture will be captured. In this way, the user 140 can be prepared for shooting in advance, for example, to put on a better expression or posture. On the other hand, by automatically capturing the second image at the fourth time point with the second camera 114, it is possible to ensure that the time for capturing the first and second images is close enough. In this way, it is possible to make the first and second images almost two images captured at the same time.

In the example of FIG. 6D, the first image window 630 is presented in a first size, and the second shooting window 640 overlaps on the first image window 630 in a second size smaller than the first size. In some embodiments, the size of the second shooting window 640 may be preset or adjusted by the user 140. Additionally, or alternatively, in some embodiments, the positions presented by the first image window 630 and the second shooting window 640 in the second shooting page 620 may also be exchanged in response to window switch commands. For example, if the terminal device 110 detects a predetermined operation (e. g., clicking, etc.) on the second shooting window 640, the positions presented by the first image window 630 and the second shooting window 640 can be exchanged.

The user 140 may view the scene captured by the second camera 114 in a larger window by adjusting (for example, enlarging) the size of the second shooting window 640, or by exchanging the positions presented by the first image window 630 and the second shooting window 640. Thus, the user 140 can be easily prepared for shooting.

Figure 6E:
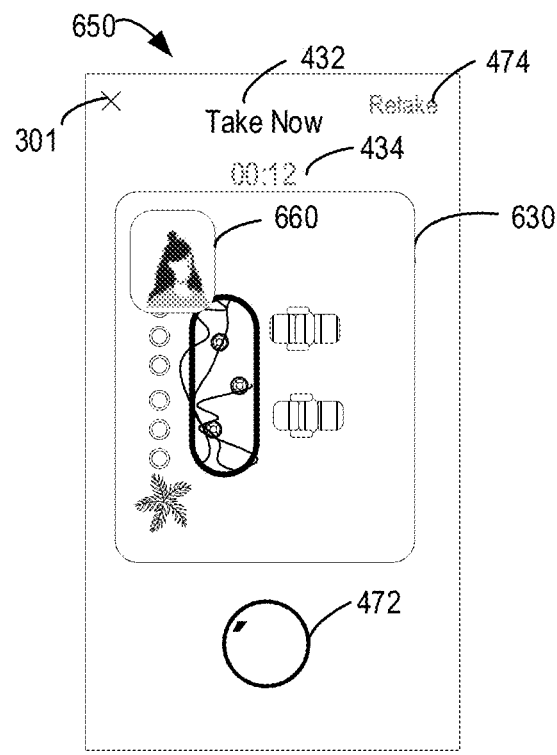
Figure 6F:
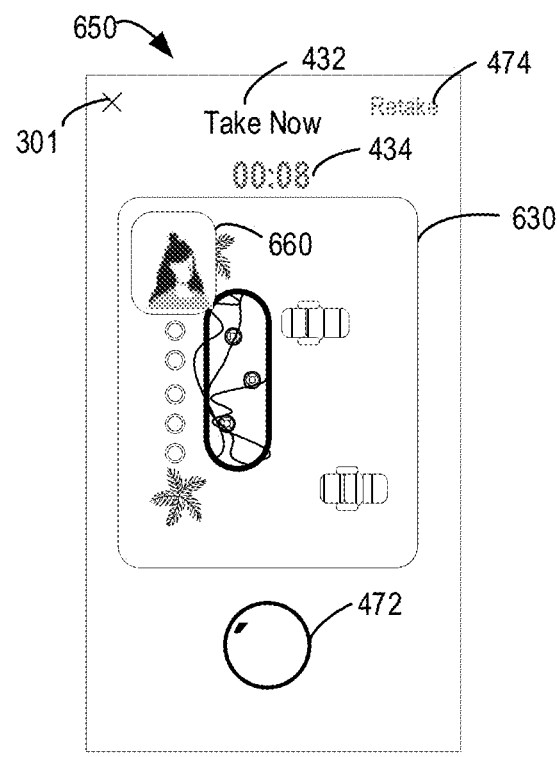

In some embodiments, if the second camera 114 completes capturing the second image, the terminal device 110 presents the first and second images on the post page. One of the first or second image at least partially overlaps on the other image. FIG. 6E shows a schematic diagram of an example post page 650. In the post page 650, the first image window 630 and the second image window 660 are presented. The first video captured by the first camera 112 is displayed in the first image window 630. The third picture captured by the second camera 114 is displayed in the second image window 660. Graphic elements similar to post page 470 are presented in post page 650. These graphic elements will not be described again here.

In the post page 650, the first image window 630 is presented in a first size, and the second image window 660 overlaps on the first image window 630 in a third size smaller than the first size. The third size is smaller than the second size of the second shooting window 640 in FIG. 6D.

In some embodiments, if a fourth predetermined operation for the first image (or the first image window 630) or the second image (or the second image window 660) is detected while the post page 650 is presented, the positions of the first and second images presented on the post page 650 are exchanged. The fourth predetermined operation may be a touch or click of the user 140's finger 436 on the first image window 630. If the terminal device 110 detects the fourth predetermined operation, the first image window 630 is exchanged with the second image window 660.

By exchanging the first image window 630 with the second image window 660, an image to be viewed can be enlarged for viewing. In this way, the user 140 can determine whether he or she is satisfied with the first and second images before posting the images.

Additionally, or alternatively, the position or size of the first image window 630 or the second image window 660 presented in the post page 650 may be changed according to a predetermined operation (e. g., moving, dragging, zooming, etc.) on the first image window 630 or the second image window 660. In this way, the user 140 can flexibly change the layout of each image in the post page.

In some embodiments, if the terminal device 110 detects a predetermined operation (for example, selection, clicking, touching, etc.) on the post control 472, the terminal device 110 may post a composite image obtained by combining a first image (in this example, the first video) and a second image (in this example, the third picture). The composite image has the same content and layout as that presented by the first image window 630 and the second image window 660 in the current post page 650.

It is to be understood that, although in the example described above in connection with FIGS. 6A to 6F, the resultant image may be directly posted, in some embodiments, the terminal device 110 may also perform various edits on the resultant image before posting it. For example, the composite image may be cropped, intercepted, filters added, text or expression illustrations added, and so on. There are no restrictions on the way to edit the composite image. In this way, richer video content can be provided for sharing.

With respect to FIGS. 6A to 6F, the above describes several examples of using a rear camera to capture a dynamic video first, then using a front camera to capture a static image, and posting the composite image in an asynchronous shooting mode. Several examples in the asynchronous shooting mode will be described with respect to FIGS. 7A to 7I below, where a front camera is used to capture a static image first, then a rear camera is used to capture a dynamic video, and the composite image is posted.

Figure 7A:
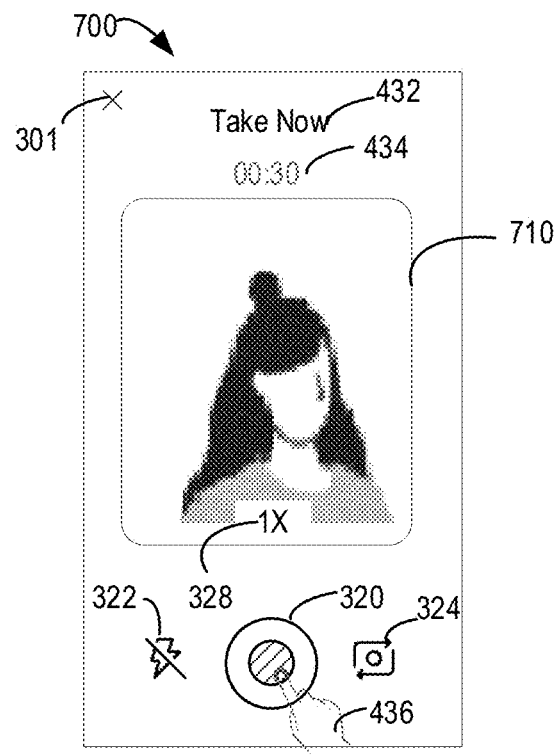
FIGS. 7A to 7I illustrate schematic views of example pages related to asynchronous image shooting according to other embodiments of the present disclosure.

FIGS. 7A to 7D show another example first shooting page 700 of mixed shooting in asynchronous shooting mode. The first shooting page 700 is similar to the first shooting page 400. Similar graphic elements between the two will not be described repeatedly. The first shooting page 700 includes a first shooting window 710. In the example of FIG. 7A, the first camera 112 is a front camera. The first shooting window 710 is a front view window.

In some embodiments, if the terminal device 110 detects a third predetermined operation on the shooting control 320 where the third predetermined operation starts at a fifth time point and a time duration of the third predetermined operation exceeds a threshold time duration, the first camera 112 captures a fourth picture at a sixth time point after the fifth time point. The fourth picture may be used as the first image. Examples of the third predetermined operation include, but are not limited to, continuous pressing of the shooting control 320 for a duration exceeding a threshold value or other appropriate operations.

In some embodiments, if the terminal device 110 detects that the duration of the third predetermined operation exceeds the threshold duration, the terminal device 110 determines that the current shooting mode is a mixed shooting mode of image and video. For example, if in the example of FIG. 7A, the terminal device 110 detects that the continuous pressing or touching of the user 140's finger 436 on the shooting control 320 exceeds the threshold duration, the terminal device 110 determines that the current shooting mode is a mixed shooting mode of image and video.

Figure 7B:
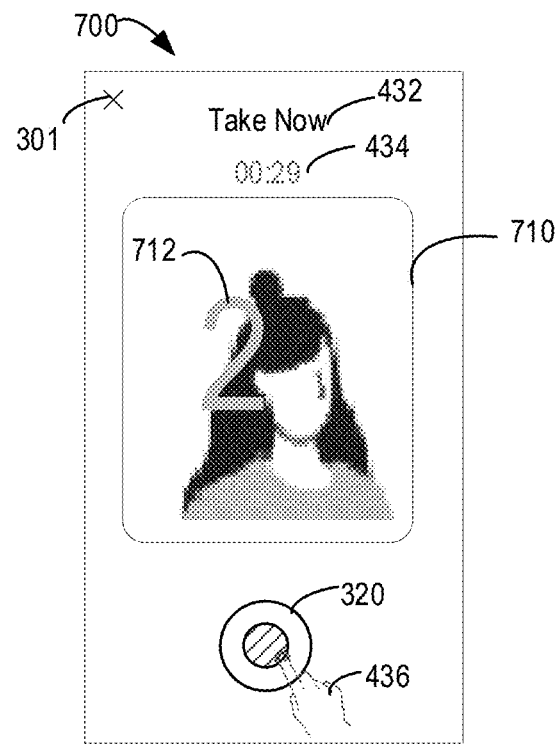

As shown in FIG. 7B, in the mixed shooting mode, only the shooting control 320 will be displayed in the first shooting page 700, and no other functional controls will be displayed (such as flash control control 322, camera flip control 324, and so on). In some embodiments, a countdown 712 is also displayed in the first shooting page 700. The countdown 712 is used to prompt the user 140 that the first camera 112 will shoot the first image. For example, taking the countdown 712 with an initial duration of 2 seconds as an example, the countdown 712 with the value "2" in FIG. 7B overlaps on the first shooting window 710. If the countdown 712 expires (that is, the sixth time point is reached), the first camera 112 will capture the fourth picture. It is to be understood that the size, color, position, and the like of the illustrated countdown 712 are only exemplary. The countdown 712 may be displayed in other forms.

Figure 7C:
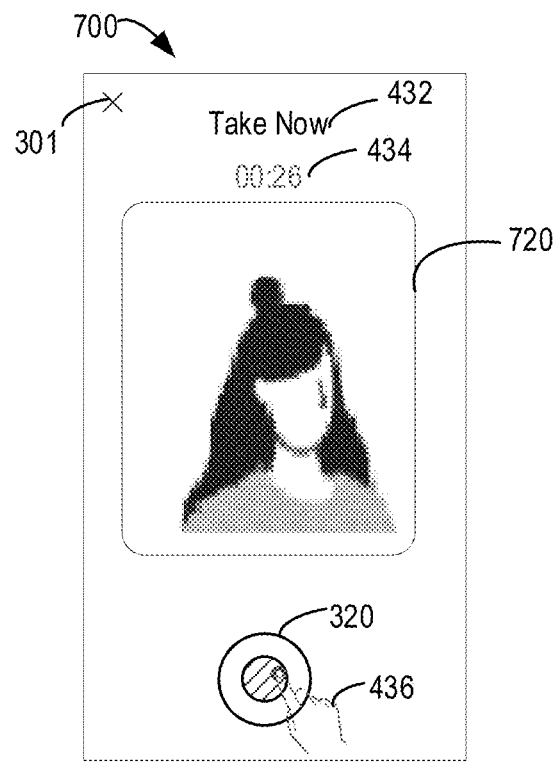
Figure 7D:
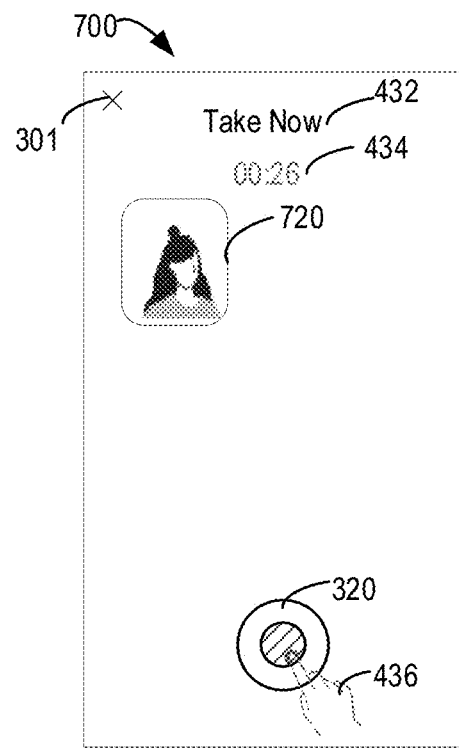

In some embodiments, as shown in FIG. 7C, the terminal device 110 presents the first image window 720 in the first shooting page 700 for presenting the fourth picture. In addition, or alternatively, as shown in FIG. 7D, the first image window 720 may have a reduced size.

Figure 7E:
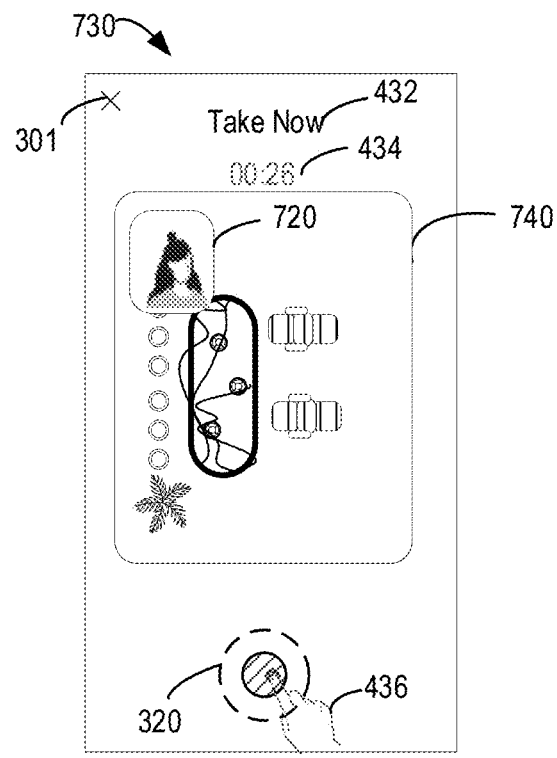
Figure 7F:
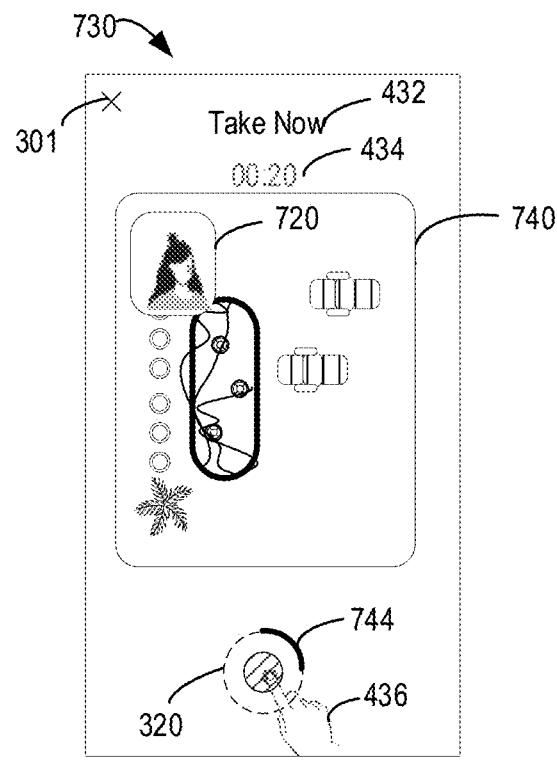

As previously described, if the first camera 112 has completed shooting of the first image (in this example, the fourth picture), the second shooting page is displayed. FIGS. 7E to 7F show an example second shooting page 730. A first image window 720 and a second image window 740 are displayed in the second shooting page 730. In this example, the second camera 114 is a rear camera. The second shooting window 740 is a rear-view window.

As shown in FIG. 7E, the shooting control 320 presented in the second shooting page 730 may have a different appearance from the shooting control 320 in the first shooting page 700. By changing the appearance of the capture control 320, the user 140 may be prompted that video capture is in progress instead of static image capture. During video capture, the finger 436 of the user 140 is pressed on the capture control 320 all the time.

In addition, or alternatively, in some embodiments, as shown in FIG. 7F, a shooting progress bar 744 is also shown on the second shooting page 730. For example, in some embodiments, a maximum duration may be set for the captured video. The shooting progress bar 744 may indicate a proportion of the currently captured video length to the maximum duration. For example, if the maximum duration is 25 seconds and the current shooting time is 6 seconds, the shooting progress bar 744 displays an arc of about a quarter, as shown in FIG. 7F. It is to be understood that the duration of the maximum duration listed above is only exemplary, and other maximum durations can be used. It is to be understood that the shooting progress bar 744 shown is only exemplary, and shooting progress bars 744 of other shapes and sizes can be used.

By presenting the progress bar 744, the user 140 can know the current shooting progress. In this way, the user 140 may complete shooting within a specified maximum video length. In other words, the user 140 can stop the third prediction operation of the shooting control 320 before the progress bar 744 fills the entire circle, so that the second camera 114 can finish photographing the second image.

In some embodiments, a second video is captured by the second camera 114 within a time period defined by the sixth time point and a seventh time point. The second video may be used as the second image. The third predetermined operation ends at the seventh time point.

In some embodiments, the size of the first image window 720 may be changed according to the user's commands during the display of the second shooting page 730. Additionally, or alternatively, the positions presented by the first image window 720 and the second shooting window 740 may be exchanged based on window switch commands. These processes are similar to those described above with respect to FIGS. 4E to 4G, and will not be repeated here.

Figure 7G:
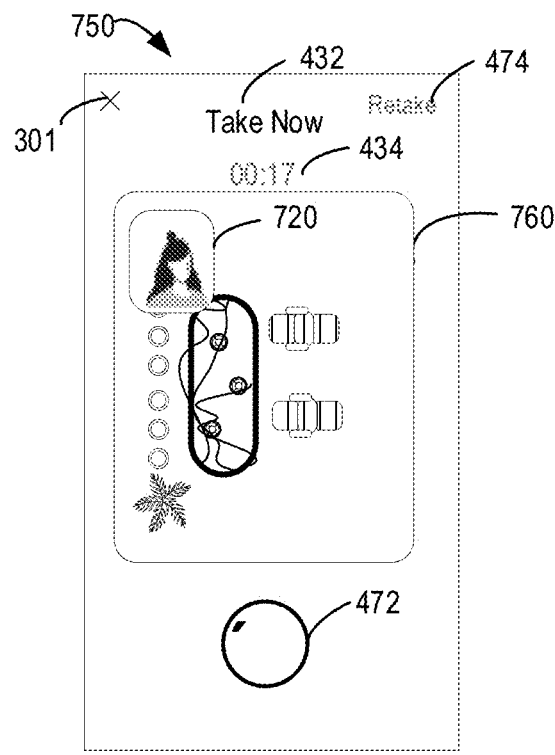
Figure 7H:
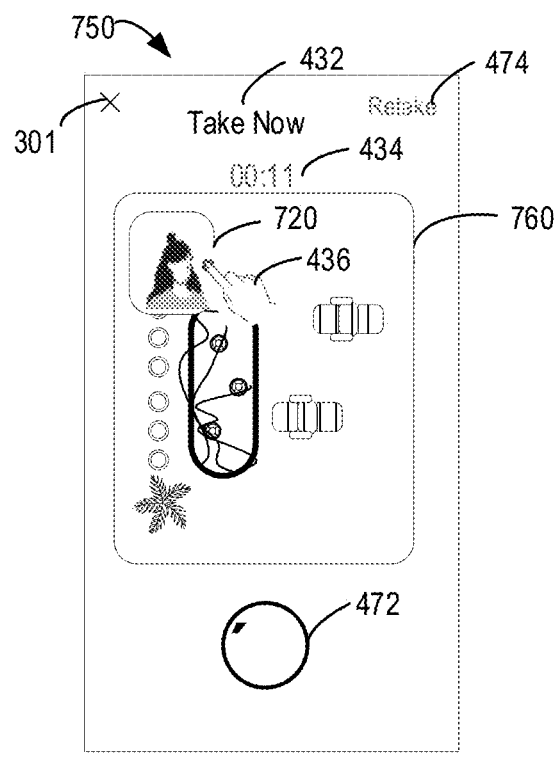
Figure 7I:
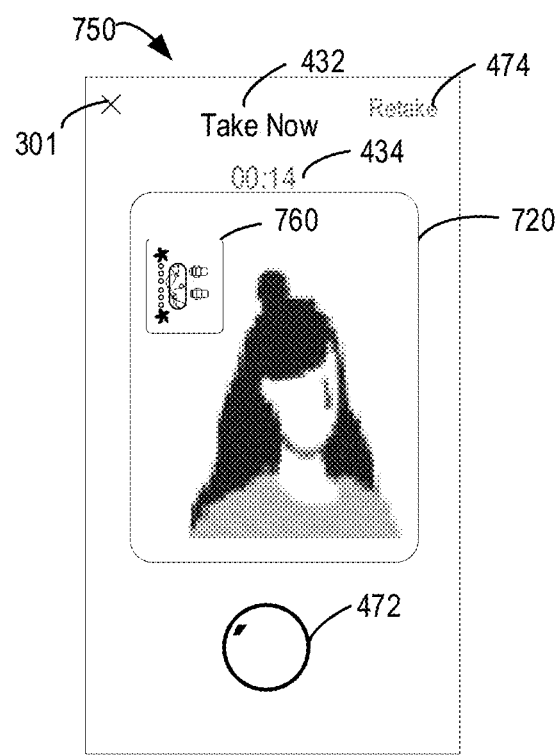

In some embodiments, if the second camera 114 completes capturing the second image (the second video in this example), the terminal device 110 presents the first and second images in the post page. One of the first or second image at least partially overlaps on the other image. FIGS. 7G to 7I show schematics of an example post page 750. In the post page 750, the first image window 720 and the second image window 760 are presented. The first image window 720 includes the fourth picture captured by the first camera 112. The second image window 760 includes the second video captured by the second camera 114. In the post page 750, the first image window 720 at least partially overlaps on the second image window 760.

Post page 750 is similar to post page 470, and similar graphic elements between them will not be described repeatedly. Different from the post page 470, the second image window 760 in the post page 750 presents dynamic images instead of static images. Comparing the second image window 760 shown in FIG. 7G and FIG. 7H, it can be seen that the image content shown in the second image window 760 is variable, not fixed.

In some embodiments, if the fourth predetermined operation for the first image (or the first image window 720) or the second image (or the second image window 760) is detected when the post page 750 is presented, the positions of the first and second images presented in the post page 750 are exchanged. In the example of FIG. 7H, the fourth predetermined operation is the touch or click of the first image window 720 by the finger 436 of the user 140. If the terminal device 110 detects the fourth predetermined operation, the first image window 720 is exchanged with the second image window 750, as shown in FIG. 7I.

By exchanging the first image window 720 with the second image window 760, a image the user want to view may be zoomed in and viewed. In this way, the user 140 can determine whether he or she is satisfied with each image before posting the image.

In some embodiments, if the terminal device 110 detects a predetermined operation (for example, selection, clicking, touching, etc.) on the post control 472, the terminal device 110 may post a composite image obtained by combining the first image (in this example, the fourth picture) and the second image (in this example, the second video). The composite image has the same content and layout as that presented by the first image window 720 and the second image window 760 in the current post page 750.

It is to be understood that, although in the example described above in connection with FIGS. 7A to 7I, the resultant image may be directly posted, in some embodiments, the terminal device 110 may also perform various edits on the resultant image before posting it. For example, the composite image may be cropped, intercepted, filters added, text or expression illustrations added, and so on. There are no restrictions on the way to edit the composite image. In this way, richer video content can be provided for sharing.

It is to be understood that although in the examples of FIGS. 4A to 7I, only asynchronous shooting of two cameras is described, in some embodiments, more cameras can be used for asynchronous multi-image shooting, and the scope of the present disclosure is not limited in this regard. Some processes and methods in the asynchronous shooting process described above with respect to the respective drawings can be used with respect to each other.

Through various example schemes described above with respect to the asynchronous shooting mode described in FIGS. 4A to 7I, multiple images can be captured by multiple cameras almost simultaneously. Specifically, the user first operates a camera of the device to capture or take images. While the camera completes shooting, the user is prompted to continue shooting with a different camera. At this time, the user can not only see the scene captured by the second camera through the device screen, but also see the image captured by the previous camera. In this way, the user can see and refer to the images previously captured by different cameras while capturing subsequent images, so that the images captured by different cameras asynchronously can be more matched with each other. In this way, for example, when the user expects to synthesize the asynchronously captured image, a better composite image can be obtained. In addition, by adopting the scheme described above, such as automatically shooting by a next camera at a predetermined time interval, when the predetermined time interval is very short, a plurality of cameras can shoot a plurality of images almost simultaneously. Thus, a composite image composed of a plurality of images captured almost simultaneously can be obtained. This flexible image shooting scheme can improve the user's participation and experience.

For example, by using this scheme, the user can obtain a composite image composed of the user's own self-portrait and the image of the user's current environment. The user can post a composite image of the user's self-portrait and the image of the user's current environment for friends to view. This kind of composite image can make the content shared by users richer and more interesting, thus improving the participation and experience of users.

On the other hand, by presenting the above various simple and easy to operate shooting pages, the user can know which camera will be shooting according to the layout of different shooting pages and window contents. The shooting process is simple and reduces the user's operation complexity. In this way, users can create content more conveniently and quickly, and also meet different shooting needs.

As mentioned earlier, for some terminal devices 110 that support multi camera synchronous shooting, a synchronous shooting scheme can be used to capture multiple images. FIGS. 8A to 8K show schematic diagrams of example pages related to synchronous image shooting according to some embodiments of the present disclosure.

Figure 8A:
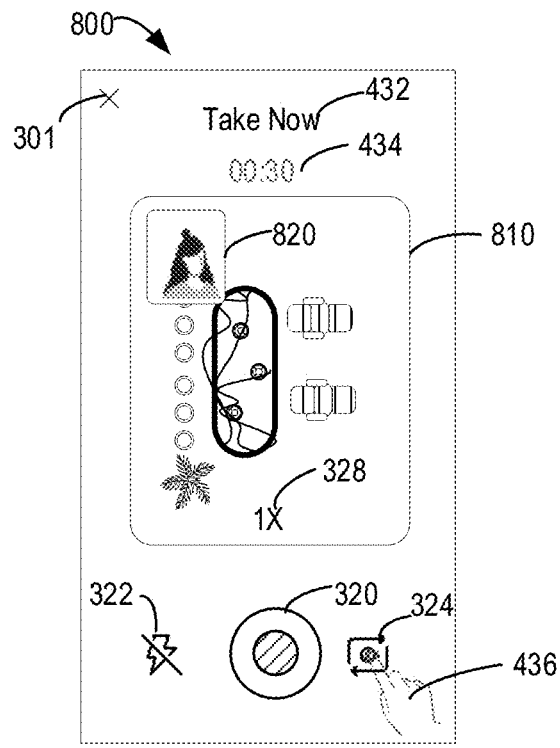
FIGS. 8A to 8K illustrate schematic views of example pages related to synchronous image shooting according to some embodiments of the present disclosure.

FIG. 8A shows an example third shooting page 800 associated with a synchronous shooting mode. The third shooting page 800 may be a page provided by the application 120. The third shooting page 800 is similar to the third shooting page 370 in FIG. 3C, and the similar parts between them will not be described repeatedly.

In some embodiments, the third shooting page 800 includes a third shooting window 810 and a fourth shooting window 820. The third shooting window 810 is used to present the first scene captured by the first camera 112. The fourth shooting window 820 is used to present the second scene captured by the second camera 114. In the example of FIG. 8A, the camera 112 is a rear camera. The third shooting window 810 may present a real-time dynamic picture associated with the rear camera, that is, a real-time dynamic picture of the rear scene. In contrast, the camera 114 is a front camera. The fourth shooting window 820 may display the real-time dynamic picture associated with the front camera, that is, the real-time dynamic picture of the front scene.

As shown in FIG. 8A, the fourth shooting window 820 at least partially overlaps on the third shooting window 810. In the third shooting window 810 presented in a larger size, a zoom multiple control 328 is presented for scaling the corresponding scene.

In some embodiments, if the terminal device 110 detects a shooting window switch command, positions of the third shooting window 810 and the fourth shooting window 820 are exchanged in the third shooting page 800. The shooting window switch command may include a predetermined operation (also referred to as a seventh predetermined operation) on the camera flip control 324, for example, selection, clicking, touching, and the like. If the terminal device 110 detects a predetermined operation of the camera flip control 324, the third shooting window 810 and the fourth shooting window 820 are exchanged.

Figure 8B:
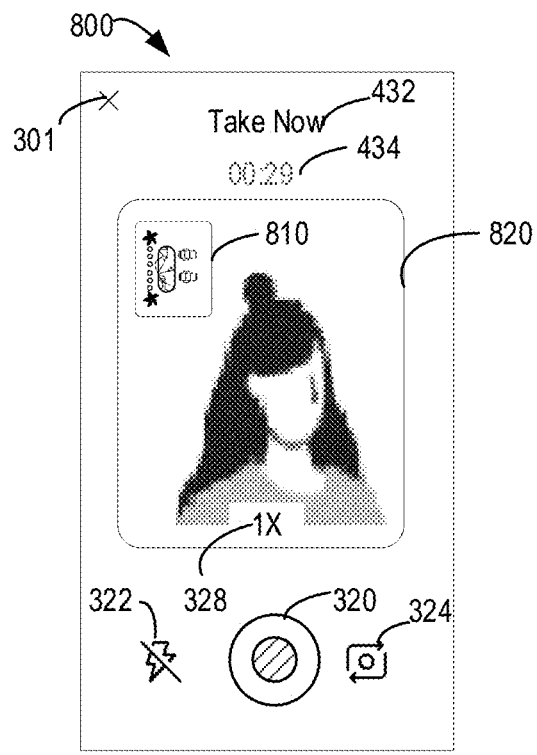

As shown in FIG. 8A, the terminal device 110 detects a predetermined operation of the camera flip control 324 by the finger 436 of the user 140. In response to this predetermined operation, the third shooting page 800 will become a page shown in FIG. 8B. In the third shooting page 800 of FIG. 8B, the third shooting window 810 at least partially overlaps on the fourth shooting window 820. In FIG. 8B, on the fourth shooting window 820 presented in a larger size, a zoom multiple control 328 is presented for scaling the corresponding scene.

Figure 8C:
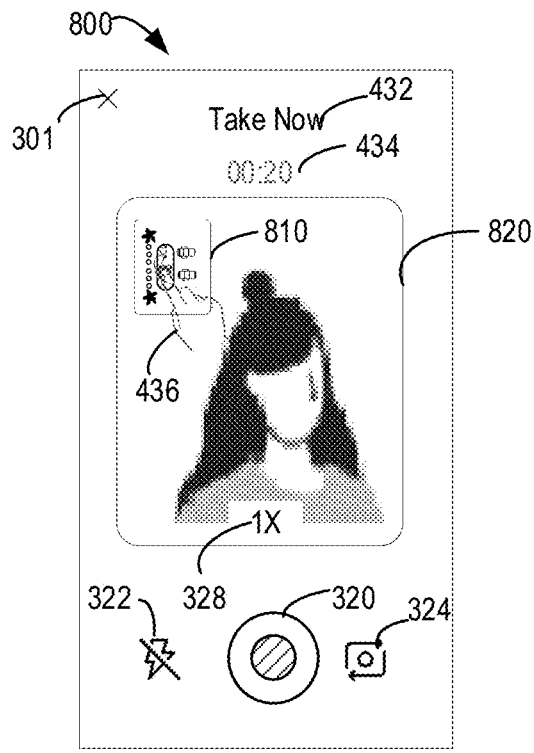
Figure 8D:
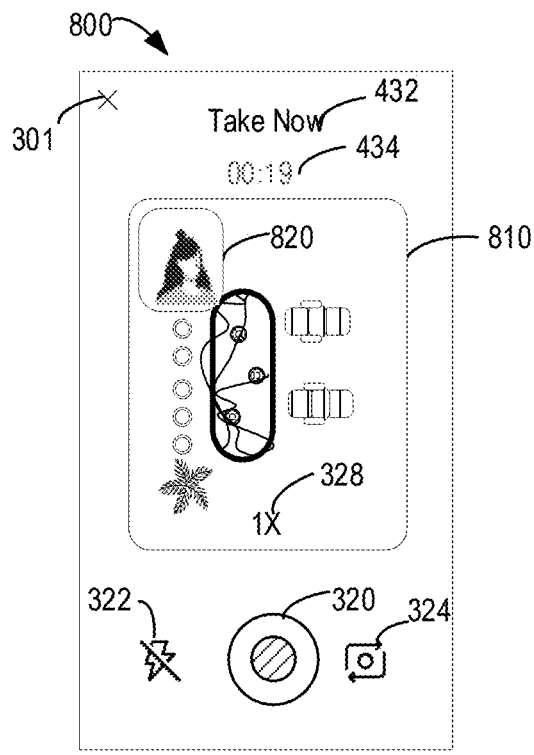
Figure 8E:
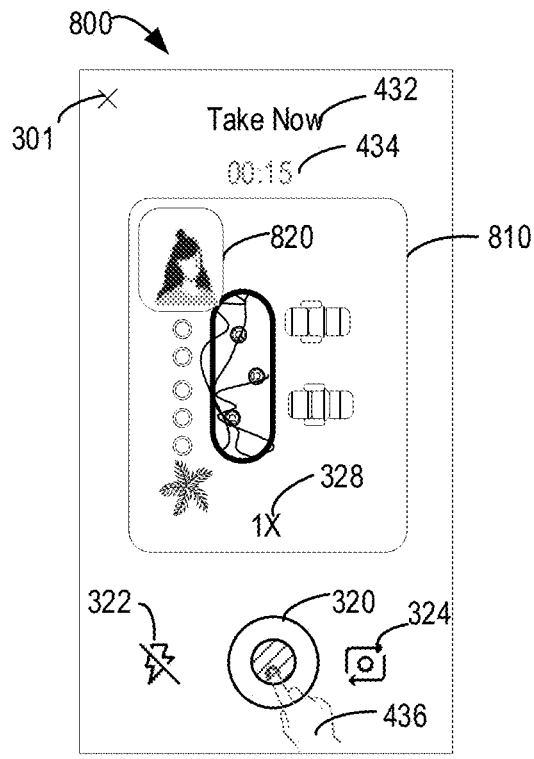
Figure 8F:
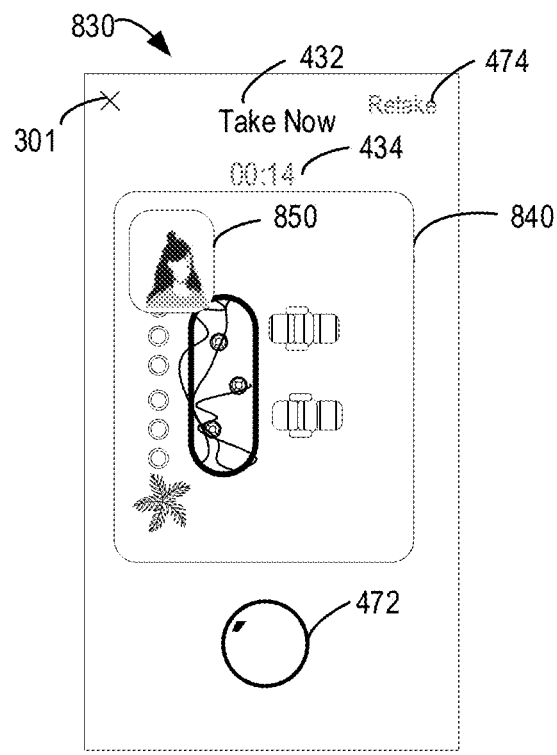
Figure 8G:
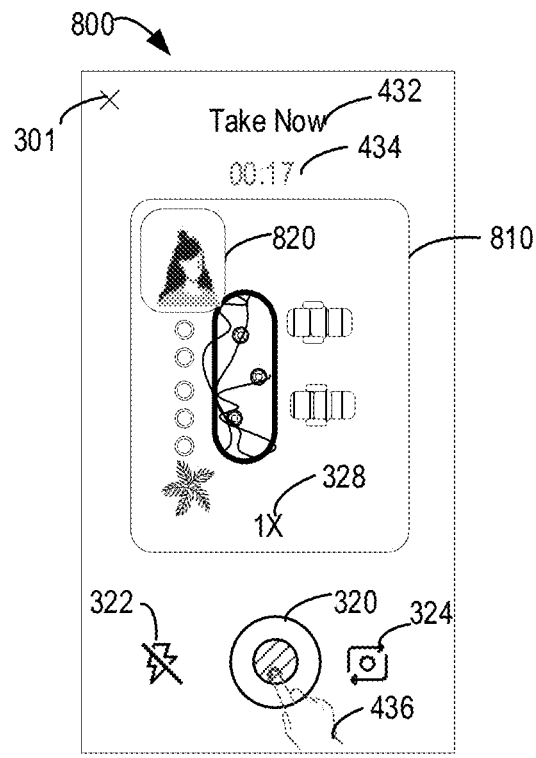
Figure 8H:
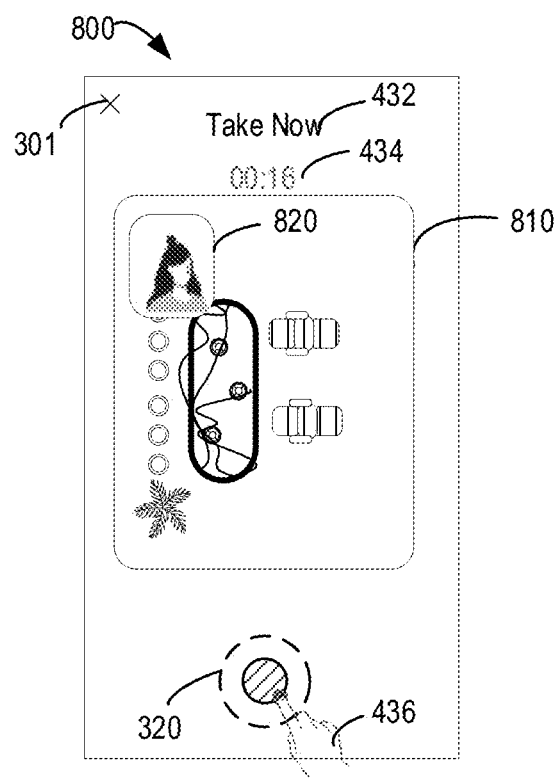

Additionally, or alternatively, in some embodiments, the shooting window switch command further comprises a predetermined operation (also referred to as an eighth predetermined operation) for the third shooting window 810 or the fourth shooting window 820. For example, as shown in FIG. 8C, the finger 436 of the user 140 performs the eighth predetermined operation (for example, clicking, pressing, and so on) on the third shooting window 810. In response to this operation, the third shooting page 800 will become a page shown in FIG. 8D. In the third shooting page 800 of FIG. 8D, the fourth shooting window 820 at least partially overlaps on the third shooting window 810.

In some embodiments, the first camera 112 and the second camera 114 are configured to capture static images by default. By performing some predetermined operation (e. g., clicking, etc.) on the shooting control 320, the first camera 112 and the second camera 114 may simultaneously capture a static image. For example, in FIG. 8E, the terminal device 110 detects a predetermined operation of the user 140's finger on the shooting control 320, and then the terminal device 110 will cause the first camera 112 and the second camera 114 to simultaneously capture a static image.

If the terminal device 110 determines that the first camera 112 and the second camera 114 have completed synchronous shooting, the terminal device 110 presents a third image captured by the first camera 112 and a fourth image captured by the second camera 114 in the post page. For example, in the post page 830 of FIG. 8F, the third image window 840 displays the third image, and the fourth image window 850 displays the fourth image. In this example, the fourth image window 850 at least partially overlaps on the third image window 840. That is, the fourth image at least partially overlaps on the third image.

In some embodiments, the third image window 840 may also at least partially overlap on the fourth image window 850. Additionally, or alternatively, if the terminal device 110 detects a predetermined operation (such as clicking or selecting) on the third image window 840 or the fourth image window 850, the terminal device 110 exchanges the positions presented in the post page 830 by the third image window 840 and the fourth image window 850.

Additionally, or alternatively, in some embodiments, one of the third image window 840 or the fourth image window 850 completely overlaps the other image window. The third image window 840 and/or the fourth image window 850 may have different transparency. For example, the third image window 840 may semi-transparently overlap on the fourth image window 850. The overlapping presentation mode of the third image window 840 and the fourth image window 850 may be arbitrary, and the scope of the present disclosure is not limited in this respect.

Additionally, or alternatively, the position or size of the third image window 840 or the fourth image window 850 presented in the post page 830 may be changed according to a predetermined operation (e. g., moving, dragging, zooming, etc.) on the third image window 840 or the fourth image window 850. In this way, the user 140 can flexibly change the layout of each image in the post page.

In some embodiments, if the terminal device 110 detects a predetermined operation (for example, selection, clicking, touching, and so on) on the post control 472, the terminal device 110 may post the composite image obtained by combining the third and fourth images. The composite image has the same content and layout as that presented by the third image window 840 and the fourth image window 850 in the current post page 830.

An example process of capturing and posting a synchronized image in a synchronized shooting mode has been described above. In some embodiments, synchronous dynamic pictures (i.e., videos) may also be captured in synchronous mode. For example, in the example of FIG. 8G, if the terminal device 110 detects that the predetermined operation of the user 140's finger 436 on the shooting control 320 exceeds the threshold duration, the terminal device 110 may change the current shooting type from the default shooting of static image to the shooting of dynamic image.

Figure 8I:
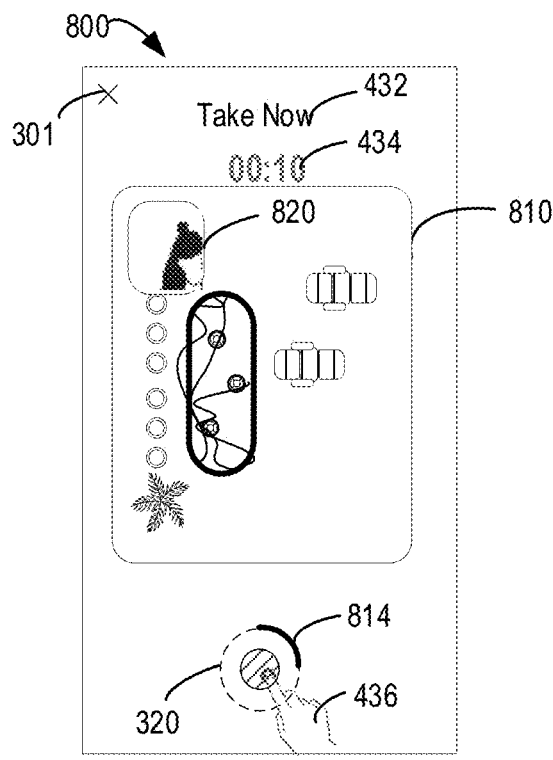

FIG. 8I shows a third shooting page 800 for capturing a synchronous dynamic image. In the third shooting page 800, the appearance of the shooting control 320 is changed to prompt the user 140 that a dynamic image is being captured. In the third shooting page 800, the finger 436 of the user 140 continuously performs a predetermined operation on the shooting control 320 to enable the first camera 112 and the second camera 114 to perform synchronous image shooting.

In some embodiments, the third shooting page 800 also displays a shooting progress bar 814. For example, in some embodiments, a maximum duration may be set for the captured video. The shooting progress bar 814 indicates a proportion of the currently captured video length to the maximum duration. By presenting the progress bar 814, the user 140 can be informed of the current shooting progress. In this way, the user 140 may complete shooting within a specified maximum video length.

In some embodiments, synchronous video is captured by the first camera 112 and the second camera 114 within a time period defined by a time point at which synchronous image shooting is entered and a time point at which the predetermined operation of the capture control 320 is stopped.

It is to be understood that in the above process of synchronous image capture, the positions of the third shooting window 810 and the fourth shooting window 820 may be exchanged similarly to those in the process of synchronous image capture. The description will not be repeated here.

In some embodiments, if the first camera 112 and the second camera 114 complete shooting, the terminal device 110 presents the third and fourth images in the post page. One of the third or fourth image at least partially overlaps on the other image.

Figure 8J:
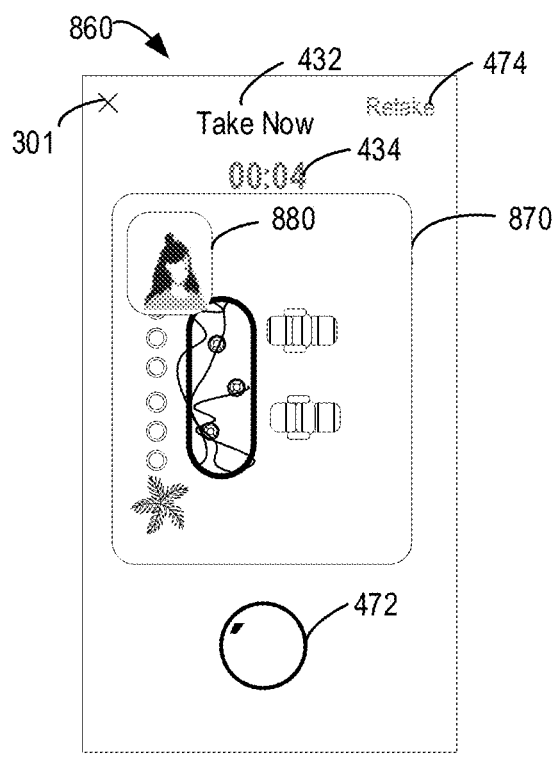
Figure 8K:
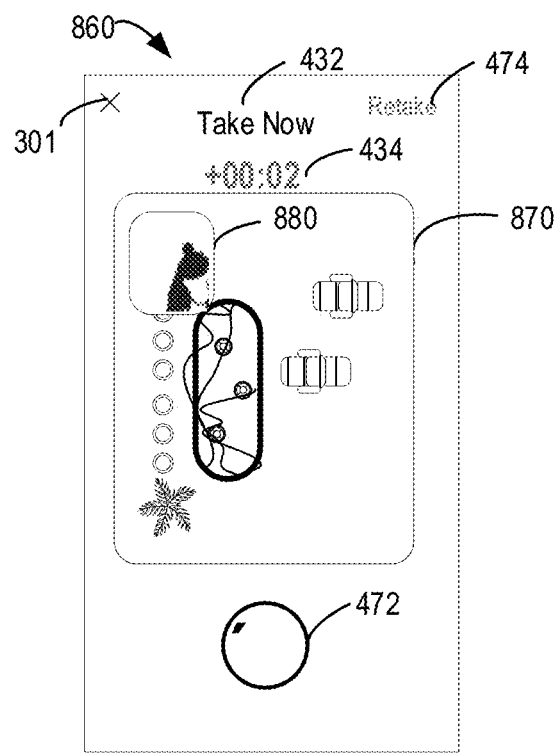

FIG. 8J shows an example post page 860, which is similar to the post page 830. Different from the post page, the third image window 870 and the fourth image window 880 in the post page 860 may present dynamic image content instead of static images. For example, by comparing FIG. 8J and FIG. 8K, it can be seen that the contents presented in the third image window 870 and the fourth image window 880 are dynamically changing contents.

Similar to the post page 830, in the post page 860, the positions of the third image window 870 and the fourth image window 880 may also be exchanged. This will not be described in detail here. By exchanging the third image window 870 with the fourth image window 880, an image the user wants to view may be zoomed in and viewed. In this way, the user 140 can determine whether he or she is satisfied with each image before posting the image.

Additionally, or alternatively, the position or size of the third image window 870 or the fourth image window 880 presented in the post page 860 may be changed according to a predetermined operation (e. g., moving, dragging, zooming, etc.) on the third image window 870 or the fourth image window 880. In this way, the user 140 can flexibly change the layout of each image in the post page.

In some embodiments, if the terminal device 110 detects a predetermined operation (for example, selection, clicking, touching, and so on) on the post control 472, the terminal device 110 may post the composite image obtained by combining the third and fourth images. The composite image has the same content and layout as that presented by the third image window 870 and the fourth image window 880 in the current post page 860.

It is to be understood that, although in the example described above with respect to FIGS. 8A to 8K, the resultant image may be directly posted, in some embodiments, the terminal device 110 may also perform various edits on the resultant image before posting it. For example, the composite image may be cropped, intercepted, filters added, text or expression illustrations added, and so on. There are no restrictions on the way to edit the composite image. In this way, richer video content can be provided for sharing.

It is to be understood that the various predetermined operations listed above are only exemplary and not restrictive. The predetermined operation may be in any suitable operation mode. The operation modes include, but are not limited to, voice control commands, predetermined operations of hardware keys, specific gestures on specific pages (for example, sliding gestures), and so on. The scope of this disclosure is not limited in this respect.

It is to be understood that although in the example of FIGS. 8A to 8K, only synchronous shooting of two cameras is described, in some embodiments, more cameras can be used to capture synchronous multi-images. The scope of this disclosure is not limited in this respect.

Various example schemes in synchronous shooting mode are described above with respect to FIGS. 8A to 8K. By adopting the above scheme, a plurality of images can be captured simultaneously by a plurality of cameras. In this way, it is possible to obtain a composite image composed of multiple images captured at the same time. In addition, by presenting shooting windows for different cameras at the same time, images captured by different cameras synchronously can be more matched with each other. In this way, for example, if the user expects to synthesize the synchronously captured image, a better composite image can be obtained. This method can provide users with richer video content for sharing.

By using this solution, users can capture images of multiple different scenes with multiple cameras. For example, the user can thus obtain a composite image composed of the user's own self-portrait and the image of the user's current environment. The user can post a composite image of the user's self-portrait and the image of the user's current environment for friends to view. This kind of composite image can make the content shared by users richer and more interesting, thus improving the participation and experience of users.

Figure 9A:
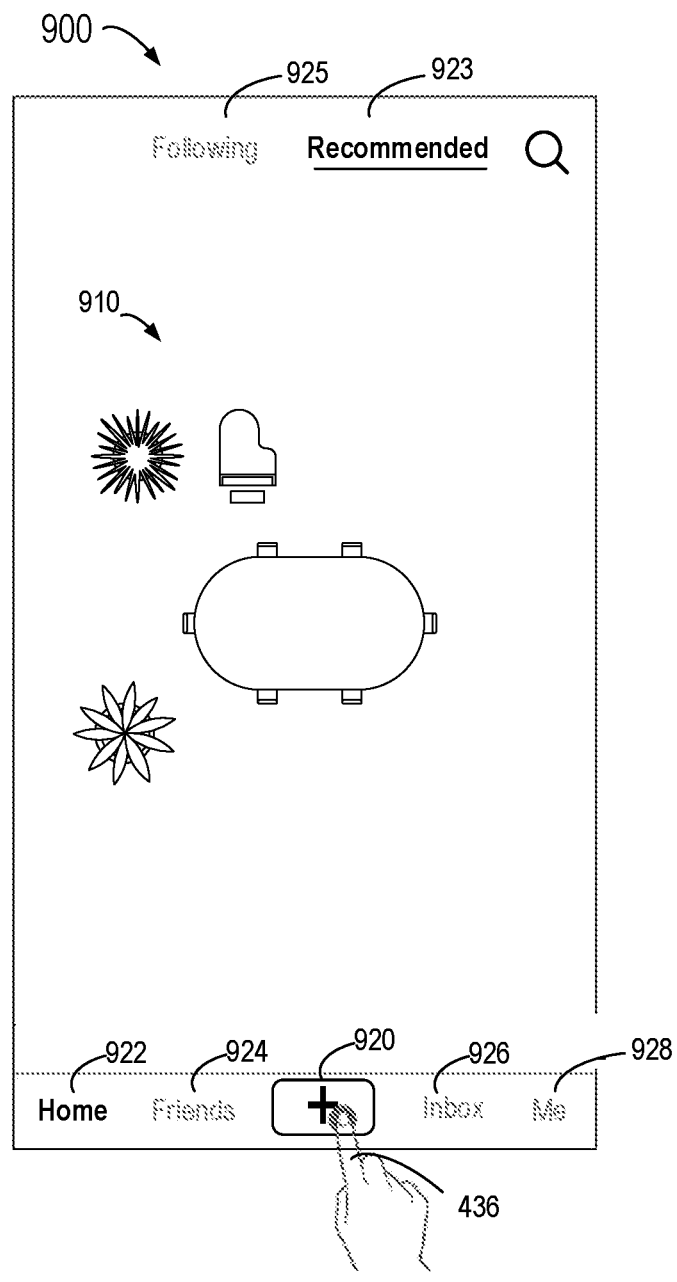
FIGS. 9A to 9G illustrate schematic diagrams of example pages of a content sharing application according to some embodiments of the present disclosure.

The asynchronous or synchronous multi-image shooting method described above can be applied to various applications 120, such as content sharing applications. FIG. 9A illustrates an example page 900 of the application 120. The page 900 can be any page of the application 120. In the example of FIG. 9A, the page 900 is a content presentation page in which an image 910 is presented. A shooting start control may be provided for the page 900 for initiating image shooting. As an example, the shooting start control may be a shooting start control 920 presented in the page 900. For example, if the terminal device 110 detects a predetermined operation (such as clicking, touching, or the like) on the shooting start control 920, the terminal device 110 may activate the asynchronous shooting mode or the synchronous shooting mode. The activation process of the asynchronous shooting mode or the synchronous shooting mode has been described above, and thus will not be repeated here.

In addition to the shooting start control 920, the page 900 further includes navigation tab bars for navigations to various pages. A "lower navigation tab bar" in the lower part of the page 900 includes navigation tabs 922, 924, 926 and 928. The navigation tab 922 has the characters "Home" indicating that the navigation tab corresponds to the home page of application 120; the navigation tab 924 has the characters "Friends" indicating that the navigation tab corresponds to the friend content page of the application 120; the navigation tab 926 has the characters "Inbox" indicating that the navigation tab corresponds to the inbox page (also referred to as the message page) of the application 120; the navigation tab 928 has the character "Me" indicating that the navigation tab corresponds to the user's personal page.

An "upper navigation tab bar" in the upper part of the page 900 includes lower-level navigation tabs of the navigation tab 922, i.e., navigation tabs 923 and 925. The navigation tab 923 has the characters "Recommended" indicating a recommended content page in which recommended content of the application 120 may be presented; the navigation tab 925 has the characters "Following" indicating a following content page in which content of following users may be presented. The page 900 corresponds to the page of the navigation tab "Recommended" 923 under the navigation tab "Home" 922, in which the recommended content, i.e., the image 910 is presented.

It is to be understood that the page 900 in FIG. 9A and pages in other drawings to be described below are merely example pages, and various page designs may exist in practice. Various graphical elements in the page may have different arrangements and different visual representations, where one or more of them may be omitted or replaced, and one or more other elements may further exist. Embodiments of the present disclosure are not limited in this regard.

In some embodiments, an indication such as "post a shared content" may be presented in the page 900 to prompt the user 140 to capture an image and post the image. It is further to be appreciated that besides the example page 900, other page of the application 120 may present the shooting start control and/or allow to initiate the shooting start command in other way.

It is to be understood that the enumerated page 900 including the shooting start control 920 is merely for illustration purpose. The user 140 may trigger a shooting start control in another page to indicate a shooting start command. The terminal device 110 may activate the asynchronous or synchronous shooting mode in response to receiving a shooting start command (or in response to detecting a predetermined operation of the shooting start control). In some embodiments, the shooting start command may be issued by the user in response to a system message about shooting image by multiple cameras. For example, shooting may be started by clicking on or selecting a system message about shooting images by multiple cameras in other pages. For example, the terminal device 110 may push system messages about shooting image by multiple cameras to the user 140 in the lock screen page or any other page.

Additionally, or alternatively, in some embodiments, the system message may also indicate time limit information to prompt the user to capture and post content information of a corresponding content type within a time limit or a specified time. As an example, the system message may be something like "Please take a composite image and share it within five minutes!", or the like. It is to be understood that the time limit such as five minutes listed above is only illustrative, not limiting. In some embodiments, the system message may indicate a content type. The content type may be a content type of at least one of the first or second image indicated by the system message. For example, the system message may indicate that both the first and second images belong to picture, both belong to video, or one belongs to an image and the other belongs to a video, and so on. The scope of this disclosure is not limited in this respect.

In some embodiments, if the user 140 clicks or touches the system message with his or her finger, for example, the application 120 is activated. If the application 120 is activated, a page 900 such as that shown in FIG. 9A is entered. In the page 900, the asynchronous or synchronous shooting mode may be activated by triggering the shooting start control 920.

Alternatively, or in addition, in some embodiments, the above system messages are sent to other devices of other users in addition to the terminal device 110 of the user 140. In this way, it is possible to instruct the user 140 and other users to capture composite image of the same content type. For example, system messages may be sent to the terminal devices of a group of users to instruct them to complete the shooting of composite images and post them within a certain period of time (also referred to as a post time limit).

In some embodiments, the user 140 may post content only within the time limit indicated by the post time limit. If the time limit is exceeded, the user 140 cannot post the content. Additionally, or alternatively, in some embodiments, the user 140 may still post content even if the content post time limit is exceeded. In such an example where the user 140 posts the content later than the content post time limit, the information that the user posts the content later than the content post time limit can be displayed. For example, content such as "four hours late" is displayed anywhere on the presentation page of the content posted by the user. It is to be understood that the time such as 4 hours listed above is only exemplary, not restrictive.

This way of sending system messages about posting images captured by multi camera to a group of users can make the process of image shooting and posting more interesting. Therefore, the user's participation and experience can be improved.

In some embodiments, the application 120 also provides other functions, such as composite image sharing function, composite image viewing function, and so on. For example, user 140 may post the composite image captured by user 140 by applying the composite image sharing function of 120. Other users may view the composite image shared by user 140.

In some embodiments, the terminal device 110 performs blur processing or mosaic processing on the above captured composite image to obtain a blurred version of the composite image. The terminal device 110 may generate a blurred image associated with the composite image based at least on the blurred version of the composite image. Additionally, or alternatively, in some embodiments, a blurred image associated with the composite image is generated by adding an illustration to the blurred version of the composite image. In addition, the blurred image associated with the composite image may be generated by adding a prompt about sharing content to view the composite image on the blurred version of the composite image.

In some embodiments, the terminal device 110 provides the blurred image associated with the composite image to other users different from the user 140. For example, if a user does not post content, such as a composite image, then if the user wants to view the composite image shared by user 140, the user is presented with a blurred image associated with the composite image shared by user 140. If a user does not have an association relationship with user 140, such as social friendship, then if the user wants to view the composite image shared by user 140, the user is presented with a blurred image associated with the composite image shared by user 140.

In this way, users can be promoted to post and share composite images. In addition, only friends can view the composite image shared by user 140, which can prevent the content shared by user 140 from being viewed by strangers, thus protecting the privacy of user 140.

An example of providing a blurred image associated with a composite image posted by user 140 to other users has been described above. It is to be understood that when user 140 does not post the composite image, or if user 140 does not have an association relationship with a user, if user 140 wants to view the composite image posted by the user, he or she will also see the blurred version associated with the user's composite image.

FIGS. 9B to 9F show schematics of an example of presenting a blurred image associated with a composite image to user 140 according to some embodiments of the present disclosure. The composite image may be synthesized from, for example, a plurality of images captured by the asynchronous or synchronous shooting method described above.

Figure 9B:
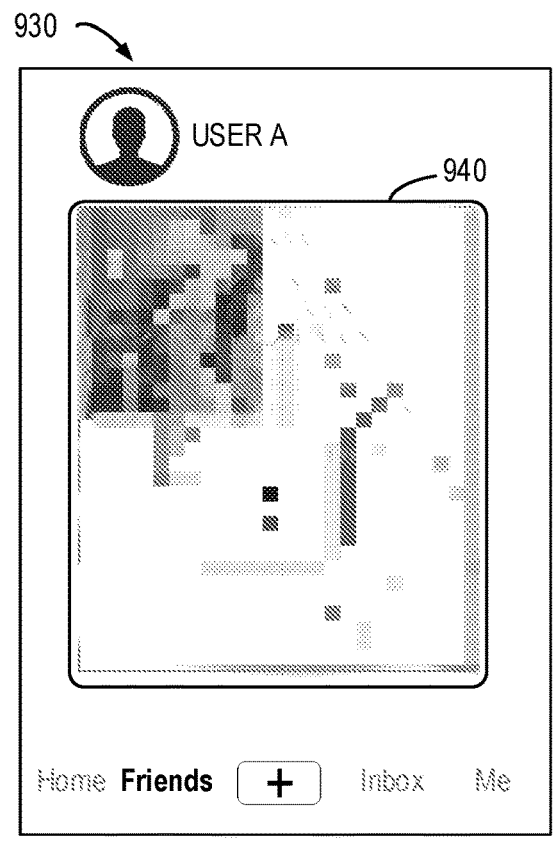
Figure 9C:
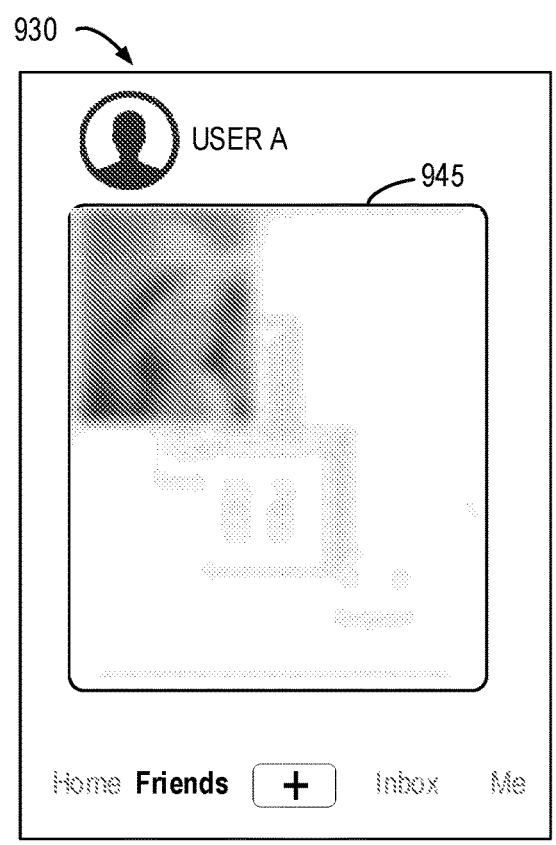

FIG. 9B illustrates a page 930 of the application 120. The page 930 may be presented in a page, e.g., with the tab "Friends" displayed at the bottom of the page. In the page 930, the user 140 may want to view a composite image shared by another user (also referred to as user A). In the example of FIG. 9B, a blurred image presented to the user 140 comprises a blurred version 940 of a composite image obtained by mosaicking the composite image posted by user A. Similarly, in the example of FIG. 9C, the blurred image comprises a blurred version 945 obtained from blur processing on the composite image posted by user A, i.e., image bokeh.

Alternatively, or in addition, in some embodiments, the blurred image further comprises an illustration overlapping the blurred version of the composite image. For example, in the example of FIG. 9D, the blurred image presented to the user 140 comprises the blurred version 945 of the composite image and an illustration 950. For purposes of explanation, a smiley picture is used as an example of the illustration 950. This is merely an example and other kind of suitable picture can be used as the illustration. Different users may adopt the same or different illustrations. The illustration may be configured by the terminal system 110 or selected by the user 140.

Figure 9D:
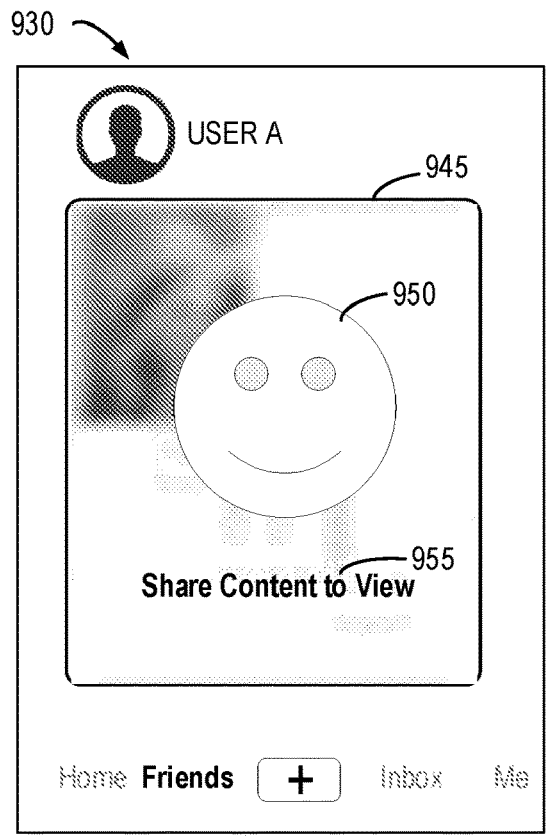
Figure 9E:
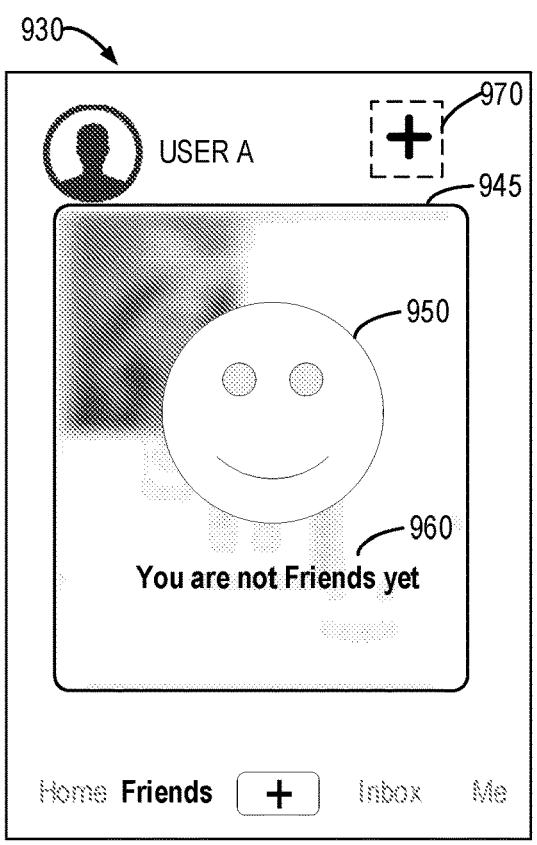

In some embodiments, the blurred image further includes an indication of sharing the content to view the first content, e.g., an indication 955 in FIG. 9D. Although the blurred image comprises both the illustration 950 and the indication 955 in the example of FIG. 9D, in some embodiments, the blurred image may only comprise one of the illustration 950 or the indication 955.

It is to be understood that the indication 955 shown in FIG. 9D is merely exemplary, and the indication 955 may comprise different content. For example, where the user 140 does not post a composite image, the indication 955 may be "Share Content to View." Where the user 140 has no association with user A, an indication 960 in FIG. 9E may be presented, such as "You are not friends yet" or other similar text, stickers, etc. Alternatively, or in addition, in the example where the user 140 has no association with user A, the page 930 may further be provided with an add friend control 970. When the user triggers the add friend control 970, the user 140 sends a friend application to user A.

In some embodiments, if the terminal device 110 determines that the user 140 has not posted a composite image, the terminal device 110 may further present the blurred profile photo of user A to the user 140. For example, there is shown in the page 930 of FIG. 9F that the profile photo of user A is a blurred profile photo 980. Alternatively, or in addition, if the user 140 has no association with user A, then the profile photo of user A which is presented to the user 140 may have been subjected to blur processing.

In some embodiments, in addition to the blurred profile photo of the profile photo of user A presented in the page 930, it is also possible to use the blurred profile photo of user A in other pages such as the search box of the friend page, media stream, the skylight of the friends page, the inbox, etc. As another example, if the user 140 receives sharing information or repost information of the composite image of user A as sent from other user, the profile photo of user A presented on the sharing information or repost information seen by the user 140 may also be a blurred profile photo. Similarly, the composite image posted by user A seen by the user 140 in the sharing information or repost information may also be a blurred image associated with the composite image.

In some embodiments, when the user 140 has an association with user A and the user 140 posts a composite image, the terminal device 110 may present the composite image posted by user A to the user 140. FIG. 9G illustrates a schematic view of an example of presenting a composite image to a user according to some embodiments of the present disclosure.

In a page 990 of FIG. 9G, unlike FIGS. 9B to 9F, the terminal device 110 presents a composite image 995 shared by user A to the user 140. In some embodiment, the composite image 995 may be presented to the user 140 as a single image. In other embodiments, as shown in FIG. 9G, the composite image may comprise two individual images, including image 993 and image 994.

In embodiments where the composite image 995 comprises two individual images, the user 140 may exchange positions of the image 993 and the image 994 by performing a predetermined operation on the image 993 and/or image 994. For example, if the user 140 clicks the image 994, the terminal device 110 may exchange positions of the image 993 and the image 994. Alternatively, or in addition, the user 140 may change the size or position of the image 993 by dragging the image 993. In this way, the user 140 can enlarge and view respective images.

Figure 9F:
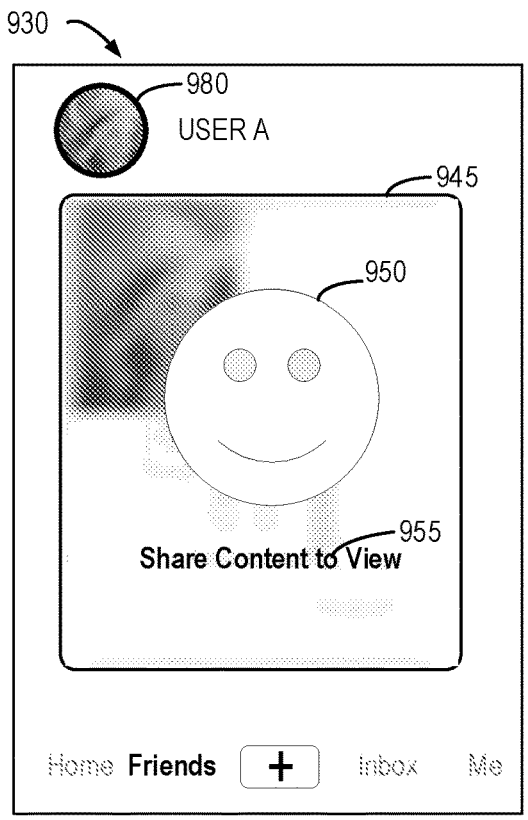
Figure 9G:
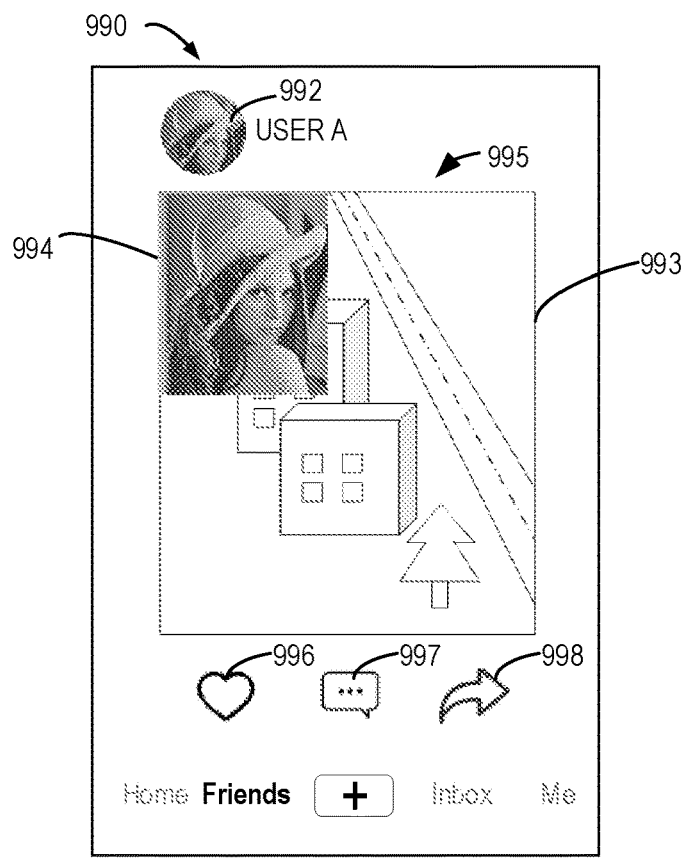

In some embodiments, unlike the blurred profile photo 980 presented in FIG. 9F, a clear profile photo 992 of user A is presented in the page 990. In some embodiments, the page 990 is further provided with a plurality of interaction controls (also referred to as interaction icons), such as a like control 996, a comment control 997, a repost control 998 and any other suitable interaction control (not shown). The user 140 may like the composite image 995 posted by user A by triggering the like control 996. The user 140 may add a comment to the composite image 995 posted by user A by triggering the comment control 997. Also, the user 140 may repost the composite image posted by user A to other user by triggering the repost control 998.

Alternatively, or in addition, in some embodiments, the presented composite image 995 may further have time information (not shown) of the composite image 995. For example, the time information may be time when the composite image 995 is created (e.g., captured), or time when the composite image 995 is shared. The time information may be displayed in the form of a timestamp, e.g., a vintage postmark, or may be presented in other suitable form.

In some embodiments, the page 990 may further present a time difference between the time when the user shared the content and the time when the user received a system message regarding shooting images by multiple cameras. For example, if the user received a message about shooting images by multiple cameras and posting images at 10:00 am, and the user did not share the content until 2:00 μm, then it may be presented in a suitable position on the page 990, e.g., the right side of the user's profile photo, that the sharing is 4 hours late. It is to be understood that various time enumerated above is merely exemplary and not limiting. The user may receive a push about a content sharing prompt at any time and may also share content at any time.

The above examples have described additional functions provided by the application 120. These functions are merely exemplary and not limiting. The application 120 may provide less or richer functions. These functions make the application 120 interesting, and thus user participation and experience is improved.

It is to be understood that various pages shown herein are merely exemplary, and in practice there may exist various page designs. Various graphical elements in the page may have different arrangements and visual representations, among which one or more of them may be omitted or replaced. Further, there may exist one or more other elements. Embodiments of the present disclosure are not limited in this regard.

It is to be understood that the example application 120 described with respect to FIGS. 9A to 9G is only exemplary. The multi camera image shooting scheme described in the present disclosure can be applied to various applications, and the scope of the present disclosure is not limited in this respect.

Figure 10:
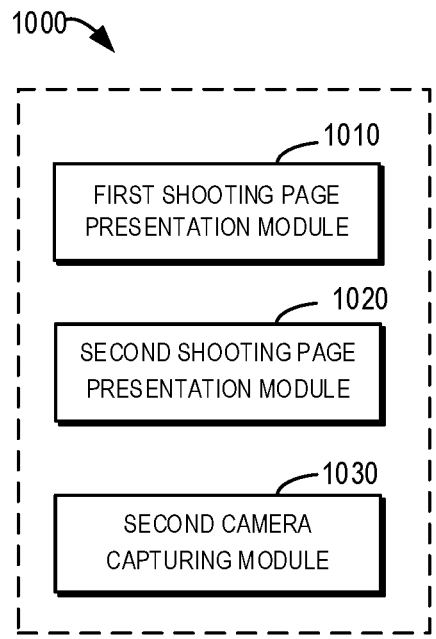
FIG. 10 illustrates a block diagram of an apparatus for image shooting according to some embodiments of the present disclosure.

FIG. 10 shows a schematic block diagram of an apparatus 1000 for image shooting according to some embodiments of the present disclosure. The apparatus 1000 may be implemented at or included in the terminal device 110. Various modules/components of the apparatus 1000 may be implemented by hardware, software, firmware or any combinations thereof.

As depicted, the apparatus 1000 comprises a first shooting page presentation module 1010 configured to present a first shooting page in an asynchronous shooting mode. The first shooting page includes a first shooting window for presenting a first scene captured by the first camera 112 of the apparatus 1000.

The apparatus 1000 further comprises a second shooting page presentation module 1020, configured to in response to the first camera 112 completing shooting of a first image, present a second shooting page comprising a second shooting window and a first image window. The second shooting page includes a second shooting window and a first image window. The second shooting window is used to present a second scene captured by a second camera 114 different from the first camera 112. The first image window is used to present the first image.

The apparatus 1000 further comprises a second camera capturing module 1030 configured to capture a second image by the second camera 114 while the second shooting page being presented.

In some embodiments, the apparatus 1000 further comprises a first picture capturing module configured to in response to detecting a first predetermined operation on a shooting control at a first time point where a time duration of the first predetermined operation is below a threshold time duration, cause the first camera 112 to capture a first picture as the first image. In this embodiment, the second camera capturing module 1030 includes a second picture capturing module configured to capture a second picture by the second camera 114 as the second image at a second time point after a first predetermined time duration from the first image being captured.

In some embodiments, the apparatus 1000 further comprises a first video capturing module configured to in response to detecting a second predetermined operation on a shooting control where the second predetermined operation starts at a second time point and ends at a third time point and a time duration of the second predetermined operation exceeds a threshold time duration, capture a first video as the first image by the first camera 112 within a time period defined by the second and third time points. In this embodiment, the second camera capturing module 1030 includes a third image capturing module configured to capture a third image as a second image by the second camera 114 at a fourth time point after a first predetermined time duration from the third time point. The first predetermined duration may be set by a system or by a user.

In some embodiments, the second shooting page presentation module 820 includes a first countdown module configured to present a first countdown related to a first predetermined duration in association with the second shooting window.

In some embodiments, the apparatus 1000 further comprises a fourth picture capturing module configured to in response to detecting a third predetermined operation on a shooting control where the third predetermined operation starts at a fifth time point and a time duration of the third predetermined operation exceeds a threshold time duration, capture a fourth picture by the first camera 112 as the first image at a sixth time point after the fifth time point. In such an embodiment, the second camera capturing module 1030 includes a second video capturing module configured to capture a second video by the second camera 114 as the second image within a time period defined by the sixth time point and a seventh time point. The third predetermined operation ends at the seventh time point.

In some embodiments, the apparatus 1000 further comprises a post page presentation module configured to in response to the second camera 114 completing shooting of the second image, present the first and second images in a post page, such that one of the first or second image at least partially overlaps on the other image.

In some embodiments, the apparatus 1000 further comprises an image position adjustment module configured to in response to a moving operation of at least one image of the first or second image in the post page, adjust a position or size of the at least one image in the post page.

In some embodiments, the first image window has a first size, and the second shooting window has a second size smaller than the first size. The second shooting window at least partially overlaps on the first image window. In such an embodiment, the post page presentation module is configured to present the first image in the first size; and present the second image in a third size smaller than the second size, such that the second image at least partially overlaps on the first image.

In some embodiments, the apparatus 1000 further comprises an image position exchange module configured to in response to detecting a fourth predetermined operation on the first or second image while the post page being presented, exchange positions of the first and second images presented in the post page.

In some embodiments, the apparatus 1000 further comprises a second countdown presentation module configured to present a second countdown related to a time duration for completing capturing or posting an image.

In some embodiments, the second countdown presentation module is configured to in response to a remaining time duration of the second countdown being below a second predetermined time duration, highlight the second countdown; and provide tactile feedback to the user 140 via the apparatus 1000. Additionally, or alternatively, in some embodiments, the second countdown presentation module is further configured to in response to an expiration of the second countdown, highlight a time duration that has passed after the expiration of the second countdown.

In some embodiments, the second shooting window at least partially overlaps on the first image window. Additionally, or alternatively, in some embodiments, the first image window at least partially overlaps on the second shooting window.

In some embodiments, the apparatus 1000 further comprises a window switch module configured to in response to detecting a window switch command while the second shooting page being presented, exchange positions of the second shooting window and the first image window in the second shooting page.

In some embodiments, the window switch command includes a fifth predetermined operation on the second shooting window or the first image window. Additionally, or alternatively, in some embodiments, the window switch command further comprises a sixth predetermined operation on a camera flip control in the second shooting page.

In some embodiments, the apparatus 1000 further comprises a function determination module configured to in response to receiving a shooting mode activation command, determining whether the apparatus 1000 supports synchronous shooting by the first camera 112 and the second camera 114. Additionally, or alternatively, the apparatus 1000 further comprises a synchronous shooting mode activation module configured to activate a synchronous shooting mode in response to a determination that the apparatus 1000 supports synchronous shooting. Additionally, or alternatively, the apparatus 1000 further comprises an asynchronous shooting mode activation module configured to in response to a determination that the apparatus 1000 does not support the synchronous shooting, activate an asynchronous shooting mode; and activate the first camera 112.

In some embodiments, the apparatus 1000 further comprises a camera activation module configured to in response to the synchronous shooting mode being activated, activate the first camera 112 and the second camera 114 for synchronous shooting of images. Additionally, or alternatively, in some embodiments, the apparatus 1000 further comprises a third shooting page presentation module configured to present the third shooting page. The third shooting page includes a third shooting window for presenting the first scene captured by the first camera 112 and a fourth shooting window for presenting the second scene captured by the second camera 114. The apparatus 1000 may further comprise a second post page presentation module configured to in response to the first camera 112 and the second camera 114 completing shooting, present the third image captured by the first camera 112 and the fourth image captured by the second camera 114 in a post page, such that one of the third or fourth image at least partially overlaps on the other image.

Figure 11:
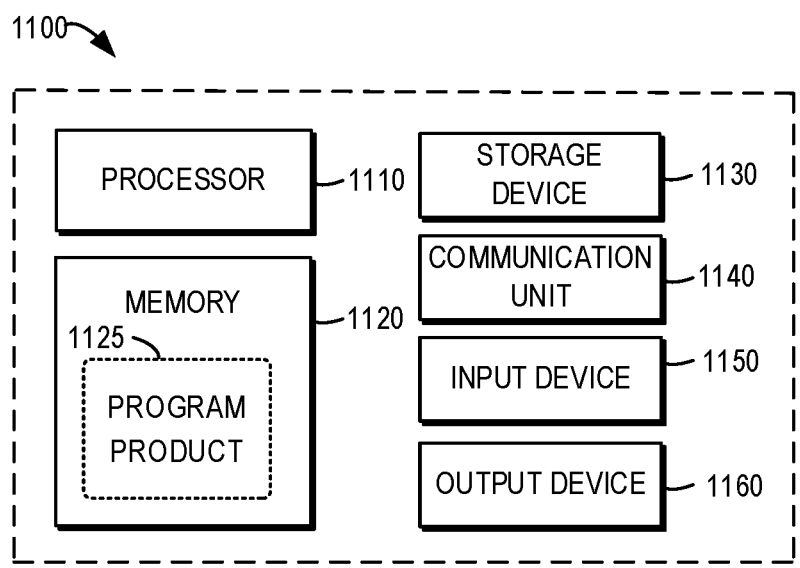
FIG. 11 illustrates an electronic device in which one or more embodiments of the present disclosure can be implemented.

FIG. 11 illustrates a block diagram of an electronic device 1100 in which one or more embodiments of the present disclosure can be implemented. It is to be understood that the electronic device 1100 as shown in FIG. 11 is merely provided as an example, without suggesting any limitation to the functionalities and scope of embodiments described herein. The electronic device 1100 shown in FIG. 11 may be used to implement the terminal device 110 of FIG. 1. As shown in FIG. 11, the electronic device 1100 is in the form of a general-purpose electronic device. Components of the electronic device 1100 may include, without limitation to, one or more processors or processing units 1110, a memory 1120, a storage device 1130, one or more communication units 1140, one or more input devices 1150 as well as one or more output devices 1160. The processing unit 1110 may be a real or virtual processor and can execute various processing according to programs stored in the memory 1120. In a multi-processor system, a plurality of processing units execute in parallel computer-executable instructions to increase the parallel processing capability of the electronic device 1100.

The electronic device 1100 usually includes various computer storage media. Such media may be any available media accessible by the electronic device 1100, including but not limited to, volatile and non-volatile media, or detachable and non-detachable media. The memory 1120 may be a volatile memory (for example, a register, cache, Random Access Memory (RAM)), non-volatile memory (for example, a Read-Only Memory (ROM), Electrically Erasable Programmable Read-Only Memory (EEPROM), a flash memory), or any combination thereof. The storage device 1130 may be any detachable or non-detachable medium and may include machine-readable medium such as a flash memory drive, a magnetic disk or any other media that can be used for storing information and/or data (e.g., training data for training) and are accessible within the electronic device 1100.

The electronic device 1100 may further include additional detachable/non-detachable, volatile/non-volatile memory media. Although not shown in FIG. 11, there may be provided a disk drive for reading from or writing into a detachable and non-detachable disk (e.g., a floppy disk), and an optical disk drive for reading from and writing into a detachable non-volatile optical disk. In such cases, each drive may be connected to a bus (not shown) via one or more data medium interfaces. The memory 1120 may include a computer program product 1125 having one or more program modules which are configured to perform various methods or acts according to various embodiments of the present disclosure.

The communication unit 1140 implements communication with another computing device via the communication medium. In addition, the functionalities of components in the electronic device 1100 may be implemented by a single computing cluster or a plurality of computing machines that can communicate with each other via communication connections. Thus, the electronic device 1100 may operate in a networked environment using a logic connection with one or more other servers, network personal computers (PCs), or further general network nodes.

The input device 1150 may include one or more of a variety of input devices, such as a mouse, keyboard, trackball and the like. The output device 1160 may be one or more output devices, such as a display, loudspeaker, printer and the like. By means of the communication unit 1140, the electronic device 1100 may further communicate with one or more external devices (not shown) such as storage devices and display devices, one or more devices that enable the user to interact with the electronic device 1100, or any devices (such as a network card, a modem and the like) that enable the electronic device 1100 to communicate with one or more other computing devices, if required. Such communication may be performed via input/output (I/O) interfaces (not shown).

The electronic device 1100 may further be provided with a plurality of cameras, e.g., the first camera and the second camera. The first camera and the second camera may communicate with other component of the electronic device 1100 or an external device via the communication unit 1140.

According to example implementations of the present disclosure, there is provided a computer-readable storage medium with computer-executable instructions stored thereon, wherein the computer-executable instructions are executed by a processor to realize the methods described above. According to example implementations of the present disclosure, there is further provided there is provided a computer program product tangibly stored on a non-transient computer-readable medium and comprising computer-executable instructions which are executed by a processor to realize the methods described above.

Aspects of the present disclosure are described herein with reference to flowchart illustrations and/or block diagrams of methods, apparatus (systems), and computer program products according to implementations of the present disclosure. It will be understood that each block of the flowchart illustrations and/or block diagrams, and combinations of blocks in the flowchart illustrations and/or block diagrams, can be implemented by computer-readable program instructions.

These computer readable program instructions may be provided to a processing unit of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various implementations of the present disclosure have been presented for purposes of illustration, but are not intended to be exhaustive or limited to implementations disclosed. Many modifications and variations will be apparent to those of ordinary skill in the art without departing from the scope and spirit of the described implementations. The terminology used herein was chosen to best explain the principles of implementations, the practical application or technical improvement over technologies found in the marketplace, or to enable others of ordinary skill in the art to understand implementations disclosed herein.

We claim:

1. A method of image shooting, comprising:
   displaying, in a graphical user interface, a first shooting page in an asynchronous shooting mode, the first shooting page comprising a first shooting window for displaying a first scene captured by a first camera of a terminal device;
   in response to the first camera completing shooting of a first image, displaying, in the graphical user interface, a second shooting page comprising a second shooting window and a first image window, the second shooting window displaying a second scene captured by a second camera different from the first camera, the first image window displaying the first image; and
   while displaying the second shooting page in the graphical user interface, shooting a second image by the second camera.

2. The method according to claim 1, further comprising:
   in response to detecting a first predetermined operation on a shooting control at a first time point where a time duration of the first predetermined operation is below a threshold time duration, causing the first camera to shoot a first picture as the first image,
   wherein shooting the second image by the second camera comprises: shooting a second picture by the second camera as the second image at a second time point after a first predetermined time duration from the first image being shot.

3. The method according to claim 2, wherein the first predetermined time duration is set by a system or by a user.

4. The method according to claim 2, wherein displaying the second shooting page comprises:
   displaying a first countdown related to the first predetermined time duration in association with the second shooting window.

5. The method according to claim 1, further comprising:
   in response to detecting a predetermined operation on a shooting control where the predetermined operation starts at a first time point and ends at a second time point and a time duration of the predetermined operation exceeds a threshold time duration, shooting a video within a time period defined by the first and second time points by the first camera as the first image,
   wherein shooting the second image by the second camera comprises: shooting a picture by the second camera as the second image at a third time point after a first predetermined time duration from the second time point.

6. The method according to claim 1, further comprising:
   in response to detecting a predetermined operation on a shooting control where the predetermined operation starts at a first time point and a time duration of the predetermined operation exceeds a threshold time duration, shooting a picture by the first camera as the first image at a second time point after the first time point,
   wherein shooting the second image by the second camera comprises: shooting a video by the second camera as the second image within a time period defined by the second time point and a third time point, the predetermined operation ending at the third time point.

7. The method according to claim 1, further comprising:
   in response to the second camera completing shooting of the second image, displaying, in a post page in the graphical user interface, the first and second images, such that one of the first or second image at least partially overlaps on another one of the first or second images.

8. The method according to claim 7, further comprising:
   in response to a moving operation of at least one image of the first or second image in the post page, adjusting a position or size of the at least one image displayed in the post page.

9. The method according to claim 7, wherein the first image window has a first size, the second shooting window has a second size smaller than the first size, and the second shooting window at least partially overlaps on the first image window, and
   wherein displaying the first and second images in the post page comprises:
   displaying the first image in the first size; and
   displaying the second image in a third size smaller than the second size, such that the second image at least partially overlaps on the first image.

10. The method according to claim 9, further comprising:
    in response to detecting a predetermined operation on the first or second image while the post page being displayed, exchanging positions of the first and second images displayed in the post page.

11. The method according to claim 1, further comprising: displaying, in the graphical user interface, a countdown related to a time duration for completing capturing or posting an image.

12. The method according to claim 11, wherein displaying the countdown comprises:
in response to a remaining time duration of the countdown being below a predetermined time duration,
highlighting the countdown in the graphical user interface; and
providing tactile feedback to a user via the terminal device; and
in response to an expiration of the countdown, highlighting a time duration that has passed after the expiration of the countdown in the graphical user interface.

13. The method according to claim 1, wherein the second shooting window at least partially overlaps on the first image window, or
wherein the first image window at least partially overlaps on the second shooting window.

14. The method according to claim 1, further comprising: in response to detecting a window switch command while displaying the second shooting page in the graphical user interface, exchanging positions of the second shooting window and the first image window displayed in the second shooting page.

15. The method according to claim 14, wherein the window switch command comprises:
a first predetermined operation on the second shooting window or the first image window; or
a second predetermined operation on a camera flip control in the second shooting page.

16. The method according to claim 1, further comprising:
in response to receiving a shooting mode activation command, determining whether the terminal device supports synchronous shooting by the first and second cameras; and
in response to a determination that the terminal device supports the synchronous shooting, activating a synchronous shooting mode.

17. The method according to claim 16, further comprising:
in response to a determination that the terminal device does not support the synchronous shooting,
activating the asynchronous shooting mode; and
activating the first camera.

18. The method according to claim 16, further comprising:
in response to the synchronous shooting mode being activated, activating the first and second cameras for synchronous capturing images;
displaying, in the graphic user interface, a third shooting page comprising a third shooting window for displaying the first scene captured by the first camera and a fourth shooting window for displaying the second scene captured by the second camera; and
in response to the first and second cameras completing shooting, displaying, in the graphic user interface, a third image shot by the first camera and a fourth image shot by the second camera in a post page, such that one of the third or fourth image at least partially overlaps on another one of the first or second images.

19. The method according to claim 18, further comprising:
in response to detecting a shooting window switch command while the third shooting page being presented, exchanging positions of the third and fourth shooting windows displayed in the third shooting page,
wherein the shooting window switch command comprises:
a first predetermined operation on a camera flip control in the third shooting page; or
a second predetermined operation on the third or fourth shooting window.

20. An electronic device, comprising:
at least one processing unit;
at least one displaying unit;
a first and second cameras; and
at least one memory, coupled to the at least one processing unit and storing instructions to be executed by the at least one processing unit, the instructions, when executed by the at least one processing unit, causing the electronic device to:
display, by the at least one displaying unit, a first shooting page in an asynchronous shooting mode, the first shooting page comprising a first shooting window for displaying a first scene captured by the first camera;
in response to the first camera completing shooting of a first image, display, by the at least one displaying unit, a second shooting page comprising a second shooting window and a first image window, the second shooting window displaying a second scene captured by the second camera different from the first camera, the first image window displaying the first image; and
while displaying the second shooting page by the at least one displaying unit, shoot a second image by the second camera.

21. A non-transitory computer-readable storage medium, with a computer program stored thereon, the computer program being executable by a processor to implement a method of image shooting, the method comprises:
displaying, by at least one displaying unit, a first shooting page in an asynchronous shooting mode, the first shooting page comprising a first shooting window for displaying a first scene captured by a first camera of a terminal device;
in response to the first camera completing shooting of a first image, displaying, by the at least one displaying unit, a second shooting page comprising a second shooting window and a first image window, the second shooting window displaying a second scene captured by a second camera different from the first camera, the first image window displaying the first image; and
while displaying the second shooting page by the at least one displaying unit, shooting a second image by the second camera.

* * * * *